(12) United States Patent
Hart et al.

(10) Patent No.: US 7,458,315 B2
(45) Date of Patent: Dec. 2, 2008

(54) LIQUID FLAVOR BEVERAGE SYSTEM

(75) Inventors: Burton L. Hart, Auburn, IL (US); John T. Knepler, Springfield, IL (US); Kevin G. Lowe, Virden, IL (US); David Wurtzler, Southam (GB)

(73) Assignee: Bunn-O-Matic Corporation, Springfield, IL (US)

( * ) Notice: Subject to any disclaimer, the term of this patent is extended or adjusted under 35 U.S.C. 154(b) by 210 days.

(21) Appl. No.: 10/476,928

(22) PCT Filed: May 7, 2002

(86) PCT No.: PCT/US02/14726

§ 371 (c)(1),
(2), (4) Date: May 5, 2004

(87) PCT Pub. No.: WO03/002449

PCT Pub. Date: Jan. 9, 2003

(65) Prior Publication Data

US 2005/0258186 A1    Nov. 24, 2005

(51) Int. Cl.
*A47J 31/00* (2006.01)
(52) U.S. Cl. .................. 99/279; 99/275; 99/300; 426/433

(58) Field of Classification Search .................. 99/290, 99/275, 279, 300, 280, 281, 282, 283, 284; 426/433, 434, 435
See application file for complete search history.

(56) References Cited

U.S. PATENT DOCUMENTS

| | | | |
|---|---|---|---|
| 2,755,006 A * | 7/1956 | Small et al. .................. 141/107 |
| 4,753,370 A | 6/1988 | Rudick |
| 4,889,148 A * | 12/1989 | Smazik .......................... 137/1 |
| 4,930,555 A * | 6/1990 | Rudick .......................... 141/98 |
| 4,955,507 A * | 9/1990 | Kirschner et al. ............. 222/63 |
| 5,361,560 A * | 11/1994 | Sandolo .................. 53/111 RC |
| 5,676,041 A | 10/1997 | Glucksman et al. |
| 5,778,761 A | 7/1998 | Miller |
| 6,182,555 B1 | 2/2001 | Scheer et al. |
| 6,240,829 B1 * | 6/2001 | McGarrah .................... 99/275 |

FOREIGN PATENT DOCUMENTS

WO    WO 00/47058    8/2000

* cited by examiner

*Primary Examiner*—Reginald L Alexander
(74) *Attorney, Agent, or Firm*—Barnes & Thornburg LLP

(57) ABSTRACT

A beverage apparatus (30) having a plurality of dispensing modules (32) and a housing (34) that defines a chamber (36) containing water or liquid suitable for use in brewing.

8 Claims, 42 Drawing Sheets

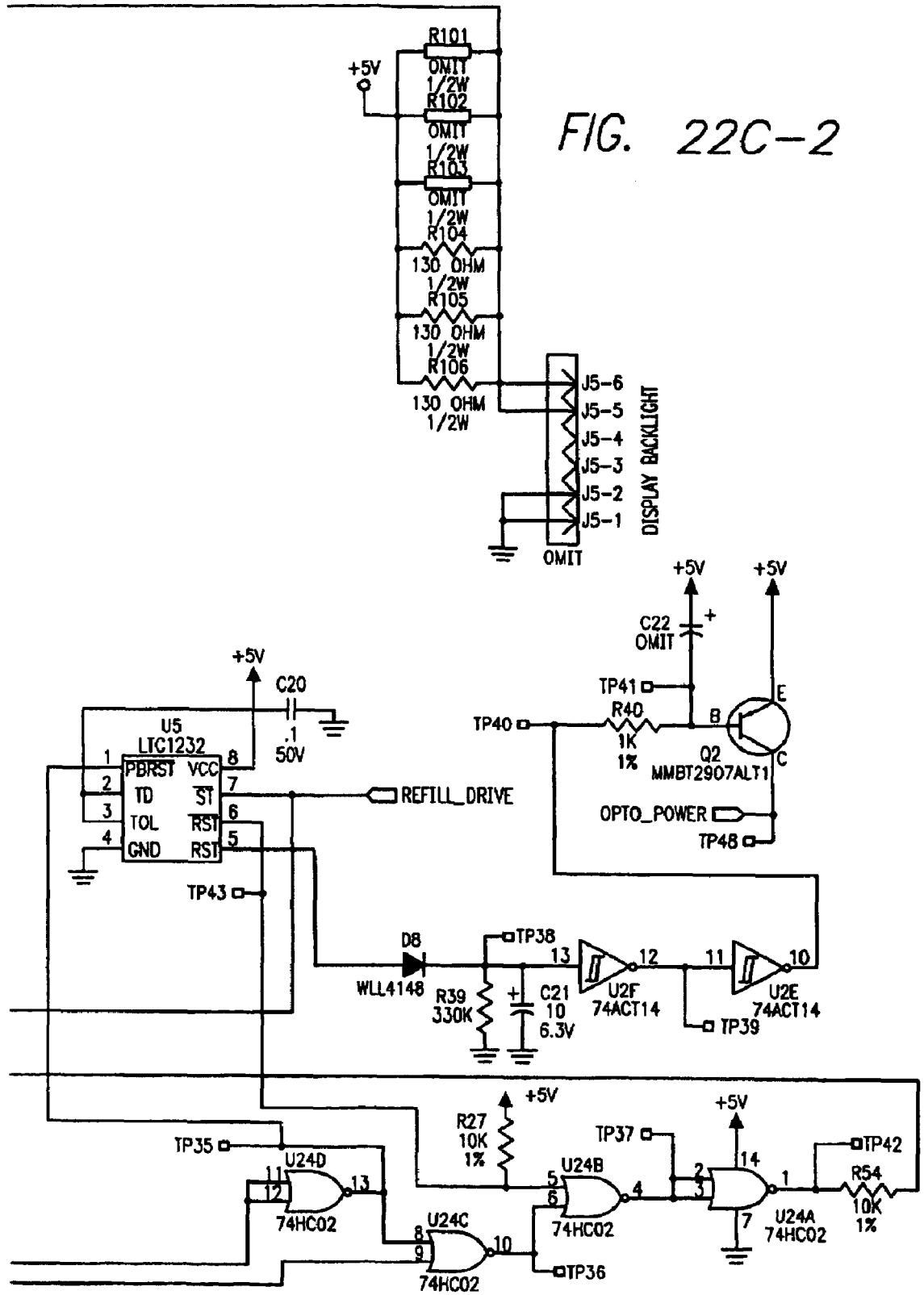

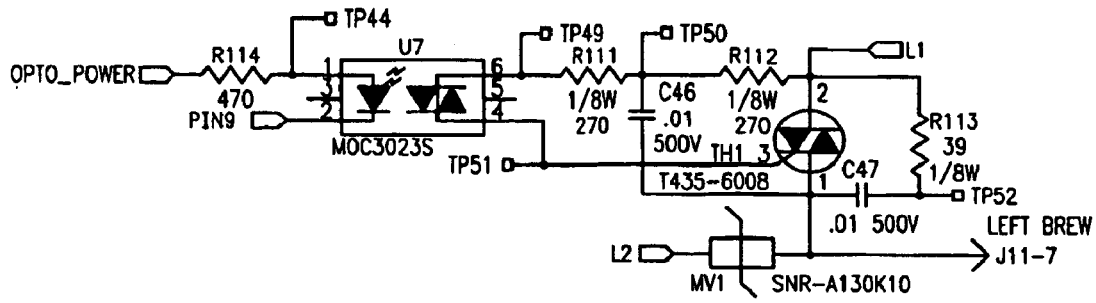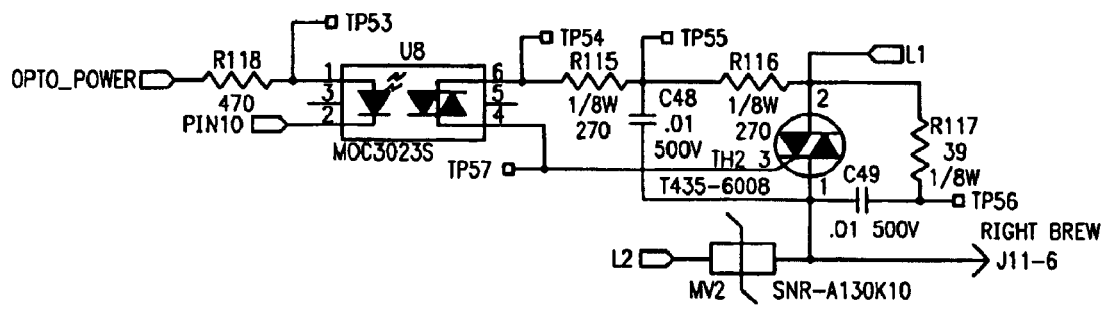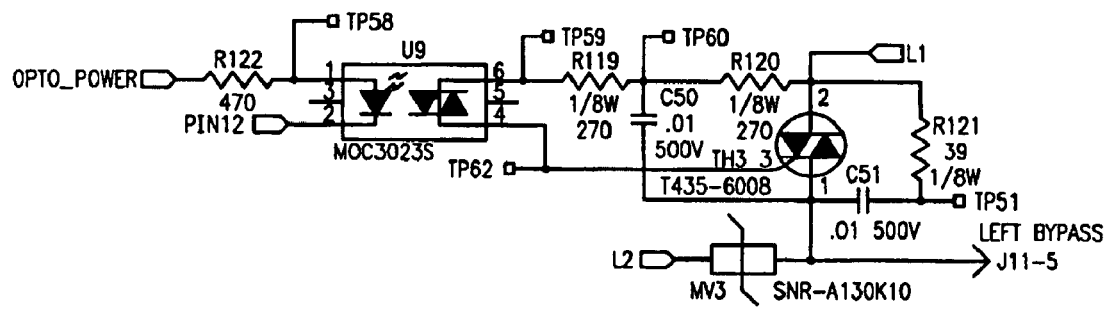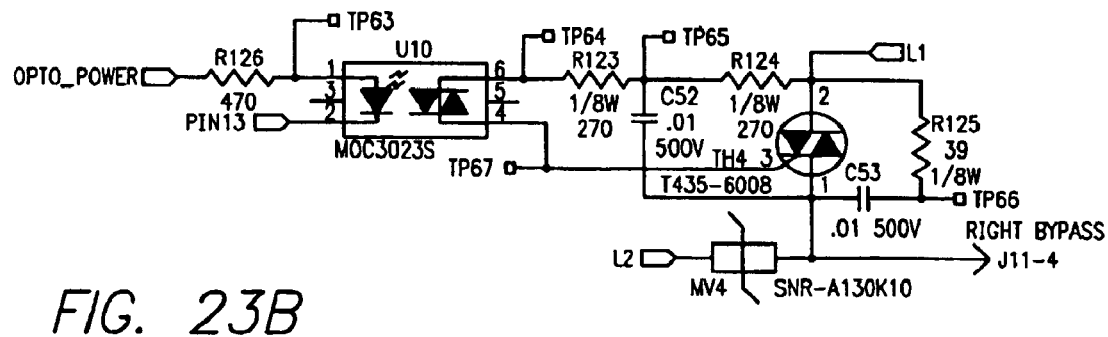
FIG. 23B

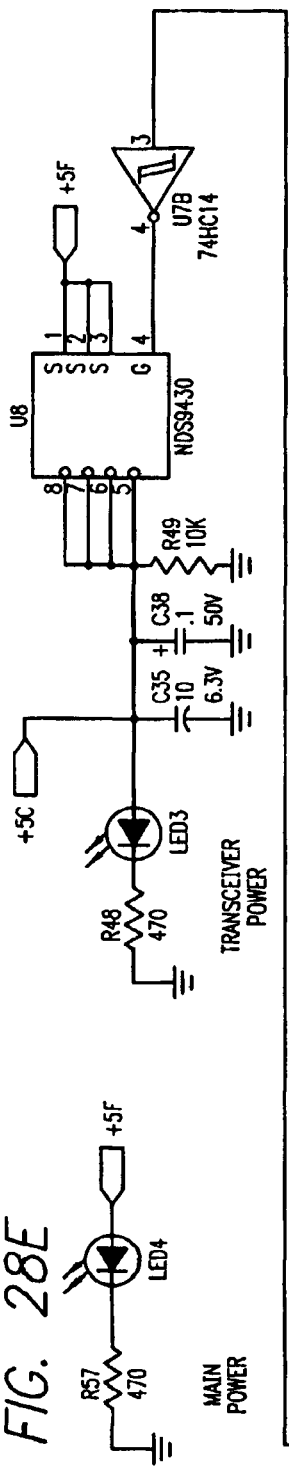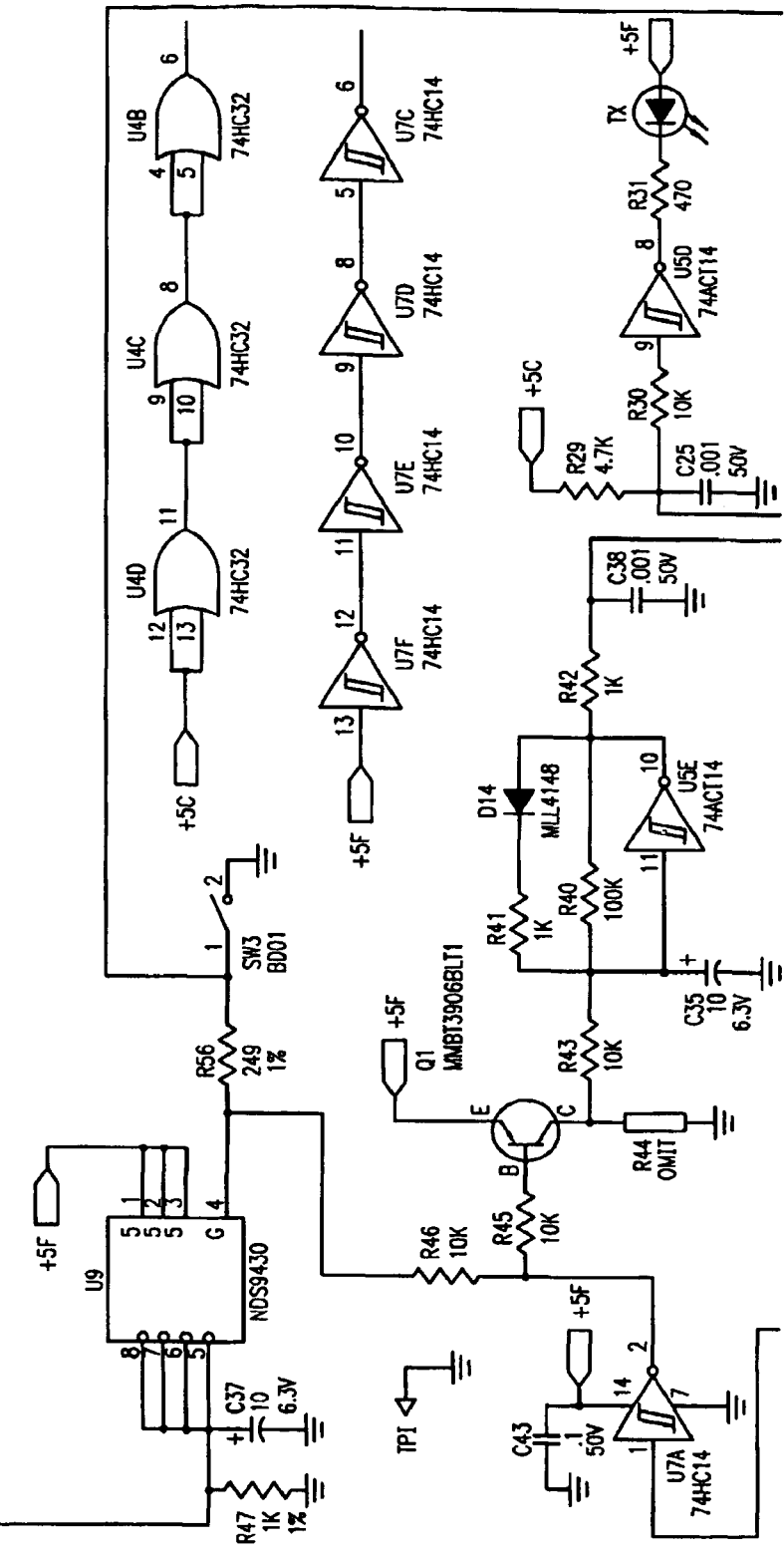
FIG. 28E

LIQUID FLAVOR BEVERAGE SYSTEM

BACKGROUND

This disclosure relates to beverage systems and, more particularly, to a beverage apparatus for preparing, dispensing, monitoring, controlling and, if desired, flavoring beverages.

Over the past 10 years, the coffee and beverage industry has experienced an evolution in connection with retail sales of fresh coffee. In particular, there is now a significant customer demand for individual servings of fresh coffee at, among other places, coffee shops, convenience stores, and fast food restaurants. Associated with the increase in demand for retail purchases of individual servings of fresh coffee are increases in demand for flavored coffee and for different types of flavored coffee as well as a variety of other beverages, such as teas, cocoas, etc.

As a result of these significant changes in the coffee and beverage industry, the service market has changed drastically over the past 10 years. Coffee shops in which consumers can walk in and purchase a fresh cup of coffee have substantially increased in number. Convenience food stores, fast food restaurants and other retailers now devote substantial floor space to serving customer demand. Moreover, these changes place increasing demands on employees of retail outlets to monitor the coffee brewing and beverage preparation equipment to ensure that there is a constant supply of fresh coffee available to consumers and in many cases to also ensure that there is a sufficient number of different flavors of fresh coffee available.

These changes in the coffee service industry have also created an increased need for efficiency in serving the consuming public. To be competitive in this expanding marketplace, efficiency in the brewing, storage, and dispensing of coffee is increasingly important. In particular, there is now a premium on being able to serve in an efficient manner the large demand for not only fresh coffee but also different flavors of coffee, in light of the substantial retail space needed for the coffee brewing and dispensing equipment and the continuous responsibilities in administering the brewing and dispensing process.

SUMMARY

The present disclosure relates to apparatus for making and dispensing beverages. The apparatus comprises a plurality of beverage dispensing modules, and a housing associated with the plurality of beverage dispensing modules and defining a chamber containing a liquid. Each beverage dispensing module has a container and an assembly for producing a respective beverage and delivering the respective beverage to the container. The liquid contained in the chamber is supplied to the assemblies to produce the respective beverages. In a preferred embodiment, each beverage dispensing module includes a dispensing valve for dispensing the respective brewed beverage from the beverage dispensing module. In a preferred embodiment, the apparatus may also include a controller for selectively activating the production of the respective beverages. The apparatus may also include a plurality of conduits for supplying liquid to the assembly.

The dispensing modules and housing may have any suitable construction and desirably are oriented in a manner that is space efficient and facilitates easy administration and usage of the apparatus. Desirably, the beverage dispensing modules have a front and a back, the backs facing the housing, and the fronts may face the same direction. The housing may be positioned behind the beverage dispensing modules. In accordance with one embodiment, for example, the apparatus also includes a plurality of second beverage dispensing modules and the fronts of the beverage dispensing modules and the fronts of the second beverage dispensing modules face opposite directions. With this embodiment, desirably the housing is positioned behind the beverage dispensers and behind the second beverage dispensers.

The apparatus may further include a heating element for heating the liquid within the housing, a level sensor for sensing the level of the liquid within the housing, and a temperature sensor for sensing the temperature of the liquid within the housing. A plurality of activation switches desirably are associated with the beverage dispensing modules, each activation switch is adapted to send a switch signal to the controller to activate production of the respective beverage. The controller preferably is adapted to activate production of the respective beverage in response to activation of the respective activation switch, a liquid level signal from the liquid level sensor, and a temperature signal from the temperature sensor. The apparatus also may include an inlet valve for providing liquid to the housing in response to a valve signal from the controller.

In addition to being able to produce and serve a plurality of respective beverages, the apparatus desirably also includes a liquid flavor dispensing assembly for dispensing flavoring to the brewing assembly of at least one of the beverage dispensing modules to flavor the respective brewed beverage. In a preferred embodiment, for example, the liquid flavor dispensing assembly selectively dispenses a plurality of different flavorings to the assemblies of at least some of the beverage dispensing modules to provide beverages having different flavors.

Additional features will become apparent to those skilled in the art upon consideration of the following detailed description of drawings exemplifying the best mode as presently perceived.

BRIEF DESCRIPTION OF THE DRAWINGS

The detailed description particularly refers to the accompanying figures in which.

DESCRIPTION OF THE DRAWINGS

Figure 1:
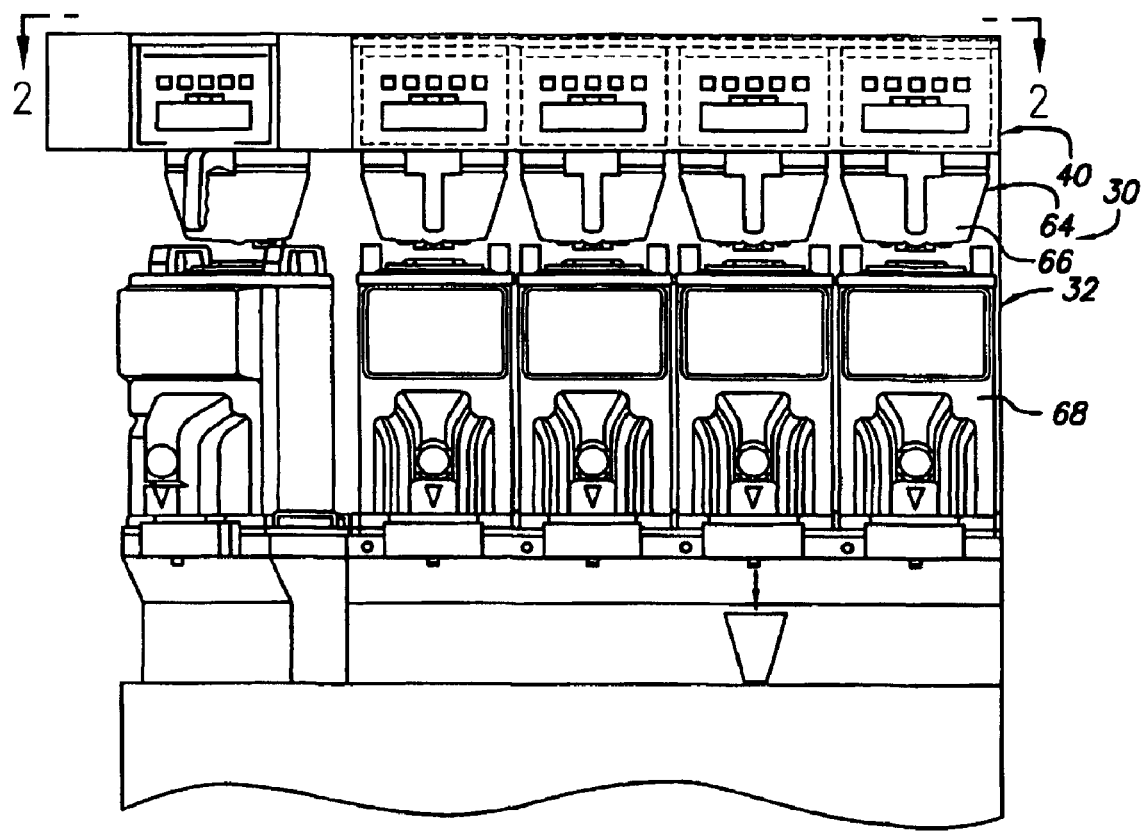
FIG. 1 is a partial fragmentary side elevational view of a modular beverage dispensing apparatus.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

A beverage dispensing apparatus 30 illustrated generally in FIGS. 1-4 as comprising a plurality of beverage dispensing modules 32 and a housing 34 that defines a chamber 36 containing water or other liquid suitable for use in brewing. The housing 34 desirably acts as a central reservoir for a constant supply of heated water to be used by the beverage dispensing modules 32 to brew several different beverages.

The beverage dispensing apparatus 30 may have any suitable construction and configuration. The beverage apparatus 30 may include any suitable number of beverage dispensing modules 32 oriented in any suitable manner, depending on various circumstances, such as, for example, customer demand, customer usage, available store space, and desired aesthetics. Similarly, the housing 34 may have any suitable construction and configuration that desirably is consistent with customer demand, customer usage, available store space and desired aesthetics. A plurality of conduits in the form of water lines 38 provide flow communication between the housing 34 and the beverage dispensing modules 32 to supply water for brewing. In a preferred embodiment, the housing 34 is positioned behind the beverage dispensing modules 32 and centrally located relative to the beverage dispensing modules 32 to minimize the distance between the housing and each of the beverage dispensing modules, thereby increasing operational efficiency and minimizing space.

Terms including beverage and beverage making as used herein are intended to be broadly defined as including but not limited to the brewing of coffee, tea and any other brewed beverage, including a final beverage or food product as well as producing an intermediate product to be combined with a final beverage or food product. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

In the illustrated embodiment, for example, the beverage dispensing apparatus 30 comprises ten beverage dispensing modules 32 oriented in a generally U-shaped manner that substantially surrounds the housing 34. As illustrated, four of the beverage dispensing modules 32 face the same direction, four other beverage dispensing modules 32 face an opposite direction, and two of the beverage dispensing modules 32 are positioned in a space-efficient manner consistent with a desired orientation.

Figure 4:
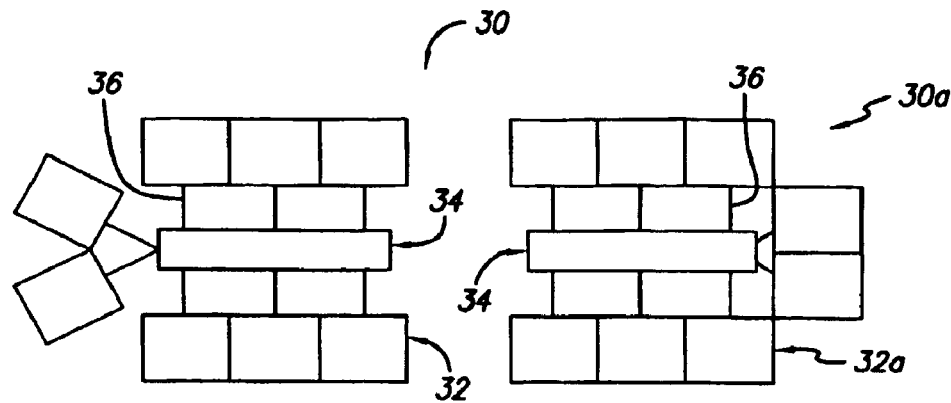
FIG. 4 is a schematic illustration of the modular beverage dispensing apparatus.

A simplified form of the beverage apparatus 30 is shown in FIG. 4 which uses simplified block diagram illustrations to show multiple beverage dispensing modules 32 which are configured to provide a beverage brewing system. The beverage apparatus 30 shown in FIG. 4 is very similar to a soluble beverage apparatus 30a also shown in FIG. 4. The beverage apparatus 30, as will be described in greater detail herein below, relates to a beverage brewing or producing system whereas the soluble beverage apparatus 30a, as will be described in greater detail herein below, relates to a soluble or powdered beverage dispensing system. Both beverage apparatuses 30, 30a employ a common heated water reservoir contained in housing 34 to which the individual modules 32, 32a are connected.

Figure 2:
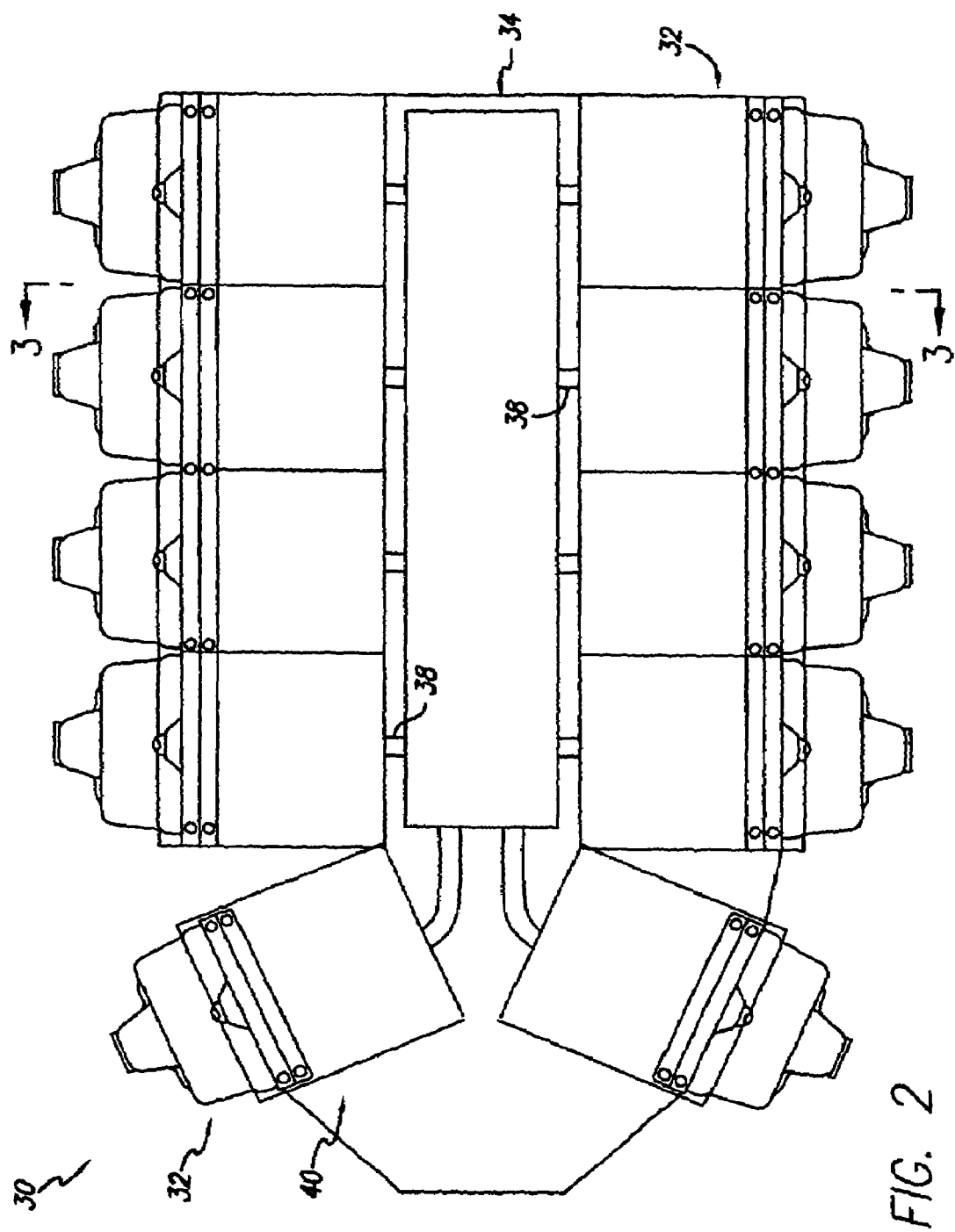
FIG. 2 is a top plan view of the modular beverage dispensing apparatus of FIG. 1.
Figure 3:
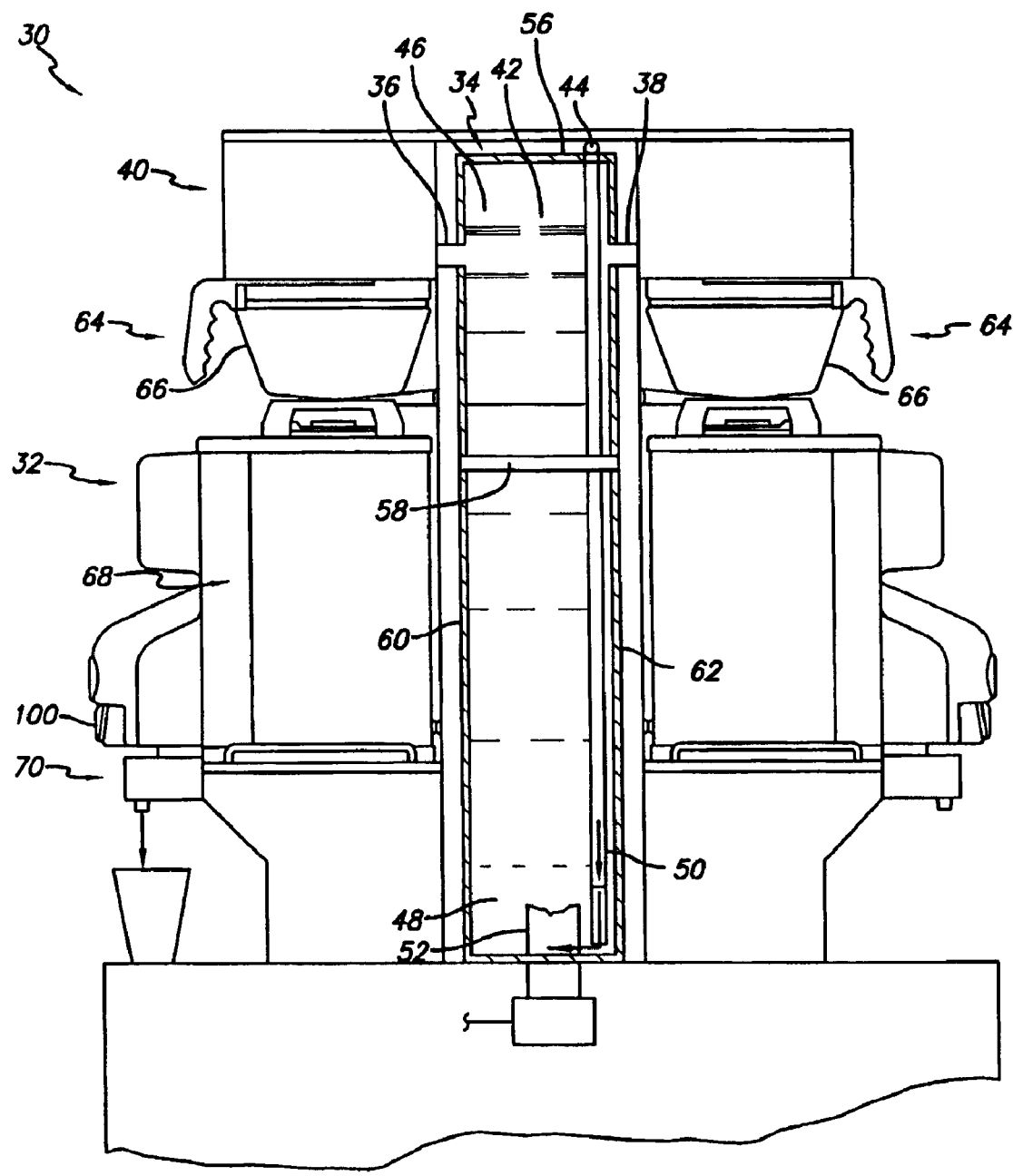
FIG. 3 is a side elevational view of the modular beverage dispensing apparatus of FIGS. 1 and 2.

As shown in FIGS. 2-4, the housing 34 desirably is centrally located to serve multiple beverage modules 32, 32a. The benefit of a common housing 34 functioning as a common reservoir to supply water, instead of individual tanks for each module 32, 32a, is that it substantially reduces the cost and greatly increases the efficiency of the system. Also it reduces the redundancy of multiple heated water reservoirs, reduces the wattage required by the system and increases flexibility in the number of modules 32, 32a which might be included.

The particular configuration with the housing 34 positioned in close proximity to or between several modules 32, 32a is beneficial in that it also minimizes the length of water lines 38 connecting the housing 34 to the modules 32, 32a. Additionally, a larger body of water in the housing 34 tends to help maintain the temperature and reduce temperature loss over time as well as maintaining a larger volume of brew water at a desired temperature. While the housing 34 retained within the beverage apparatus 30 is insulated to reduce heat loss and reduce heat load on the ambient environment, heat which may escape from the housing 34 will generally pass to the modules 32, thereby increasing the efficiency of maintaining the temperature of the beverages retained in the modules 32. Insulation desirably is provided to reduce heat loss to the ambient environment. This will also help reduce the exertion on the ambient air-conditioning system thereby further increasing efficiency of the present beverage apparatus 30, 30a.

With reference to FIGS. 1-4, each module 32, 32a produces a separate brewed beverage. The centralization of a housing 34 helps reduce the individual cost associated with the module 32,32a and improves the ease of manufacturing of the modules. Also, there is increased commonality of parts associated with this type of system. The modular configuration of the beverage apparatus 30 using the modules 32, 32a increases the potential variability of the physical size and brewer configuration of the system. This is beneficial to accommodate the needs of a particular location. In other words, only a desired or required number of modules 32, 32a will be needed at any given time. If a location has an increase in demand for brewed or soluble beverages additional modules 32, 32a may be added as necessary for the particular change in demand. Additionally, with regard to repair and maintenance, the beverage apparatus 30, 30a can be designed such that individual modules 32, 32a can be removed for repair and maintenance as necessary with an identical module being inserted in the missing modules.

In a preferred embodiment, (FIG. 5) the housing 34 includes a heating element 52, and one or more system sensors such as a level sensor 86 and a temperature sensor 84. Such components tend to be generally readily available and easily replaced and as such further enhance the reliability of the overall beverage apparatus 30, 30a.

With reference to FIG. 3, the line 38 connecting each housing 34 to a brewing portion 40 of the module 32 is shown. Water 42 retained in the housing 34 can be readily dispensed. A water inlet line 44 is provided to introduce unheated water 50 to the housing 34. The inlet line 44 runs from an upper portion 46 of the housing 34 and directs the inward water downwardly towards a bottom portion 48 of the housing 34. Introducing the unheated water 50 towards the bottom of the reservoir introduces the unheated water 50 in close relation to a heated element 52 thereby accelerating the heating of the water. Additionally, the introduction of unheated water 50 in the bottom portion 48 tends to force heated water in the upper portion 46 upwardly. As such, the water 42 in the upper portion 46 tends to be the hottest water in the housing 34.

Introducing unheated water 50 from the upper portion has the benefit of providing an entrance into the reservoir through a reservoir wall 56 with little or no pressure on the entry therethrough. This may result in an increase in the reliability of the entry therethrough. Additionally, a reinforcing or strengthening structure 58 is provided extending between opposed walls 60, 62 of the housing 34. This helps prevent bowing or stress on the walls 60, 62 which might otherwise result from the force of the water on the walls. Multiple reinforcing structures 58 may be provided throughout the housing 34 as necessary to provide support for the size and dimension of the housing required for a particular system.

Figure 5:
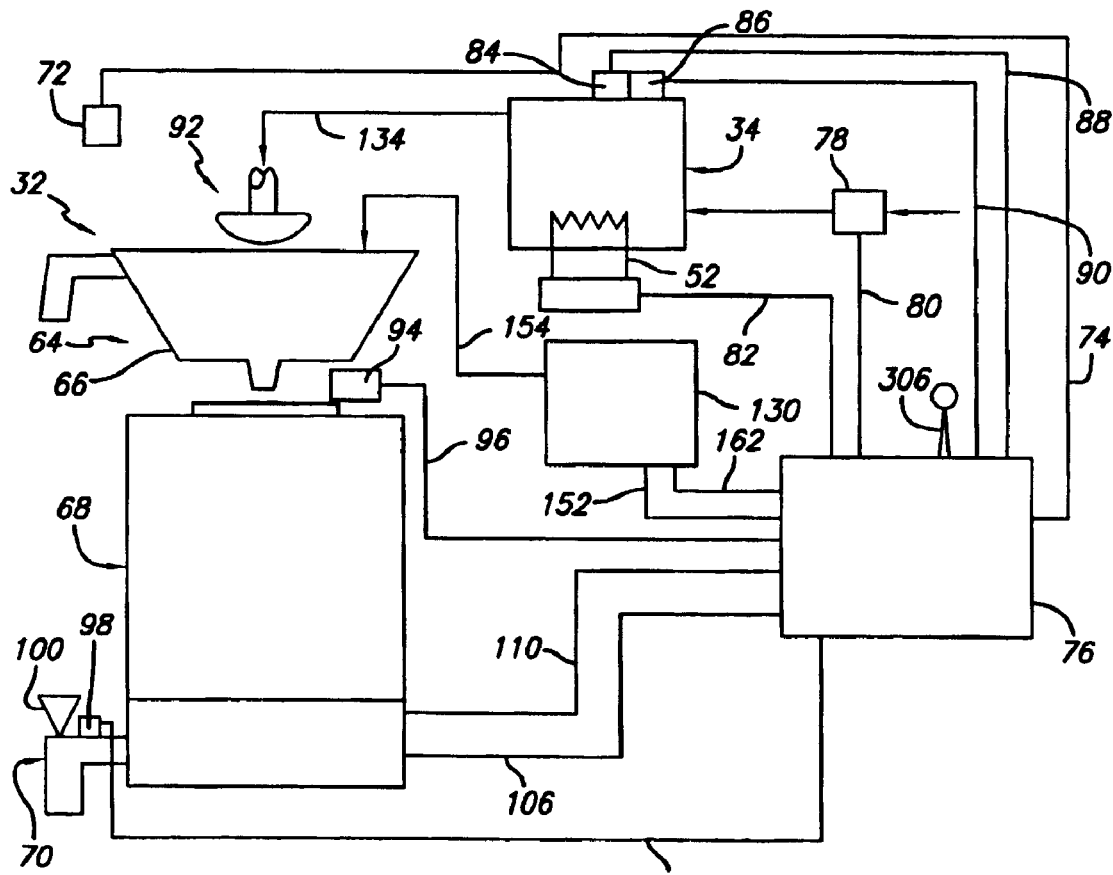
FIG. 5 is a schematic illustration of one module of the modular beverage dispensing apparatus.

FIG. 5, for example, shows a diagrammatic illustration of an embodiment of the apparatus 30 shown in FIGS. 1-4. The beverage dispensing modules 32 can have any suitable construction desirably adapted to produce beverages, store beverages for ready consumption, and facilitate ready dispensing of the beverages.

Each module 32 includes a brewing assembly 30 that may have any suitable construction that can be used to produce beverage such as brewing coffee or other beverages. The illustrated brewing assembly 30, for example, includes a brewing substance retainer or assembly 64 including a funnel 66. Such a retainer 64 may be well known in the art and may include a filter (not shown) retained in the funnel 66 for holding a charge of beverage substance. The funnel 66 may be positioned above a reservoir or container portion 68 of the dispensing module 32 which receives brewed beverage from the funnel. A dispensing assembly 70 in the form of a controllable valve may be associated with the container 68 for dispensing beverage from the module 32.

With reference to FIG. 5 a simplified review of the beverage brewing process is described. A brew actuator switch 72 desirably is associated with each of the modules 32. To initiate a brew cycle for one of the modules 32 a respective brew activation switch 72 is operated. Operation of the switch 72 sends a signal over line 74 to controller 76. Controller 76 operates an inlet valve 78 over line 80 to introduce water to the housing 34. Also, heating element 52 is coupled to the controller 76 over line 82. The temperature sensor 84 and level sensor 86 are coupled to the controller over lines 88, 90 respectively. If the controller 76 detects proper level and temperature it will initiate a brew cycle thereby displacing water from the housing 34 through a sprayhead assembly 92. The sprayhead assembly 92 communicates with the substance retainer 64 and dispenses water into the funnel 66 for producing a beverage therein.

The illustrated module 32 includes a level sensor 94 associated with the container 68 which is coupled to the control over line 96. The level sensor can detect a change in level in beverage retained in the container 68 which may be used to activate a brew cycle. Also, the level detector 94 may sense the level in the beverage container 68 thereby indicating if the container is full or above the desired level to prevent initiation of a brew cycle. This will prevent over flow of the beverage server 68.

The beverage dispensing modules 32 can be constructed to dispense beverage in any suitable manner. In a preferred embodiment, for example, a dispenser or faucet switch 98 may be associated with the dispensing assembly 70 and coupled with a dispensing handle or control 100. Activation of the control 100 will activate the switch 98 over line 102 connected to the controller 76 thereby indicating that the controller 76 should operate a solenoid valve 104 (FIGS. 6 and 7), via line 106 to dispense beverage therefrom. As will be described in greater detail below with regard to FIGS. 6 and 7, a disposal or dump valve 108 is also coupled with the container 68 to facilitate controllable disposal, via line 110 coupled to the controller 76.

Figure 6:
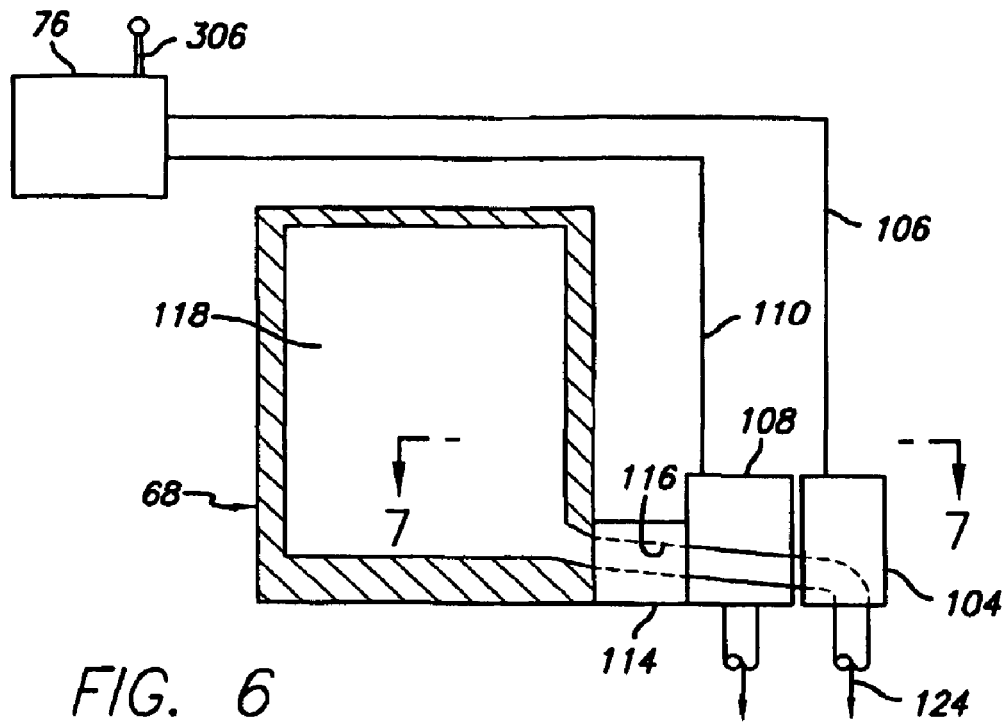
FIG. 6 is a diagrammatic illustration of a dispensing and disposal valve configuration.
Figure 7:
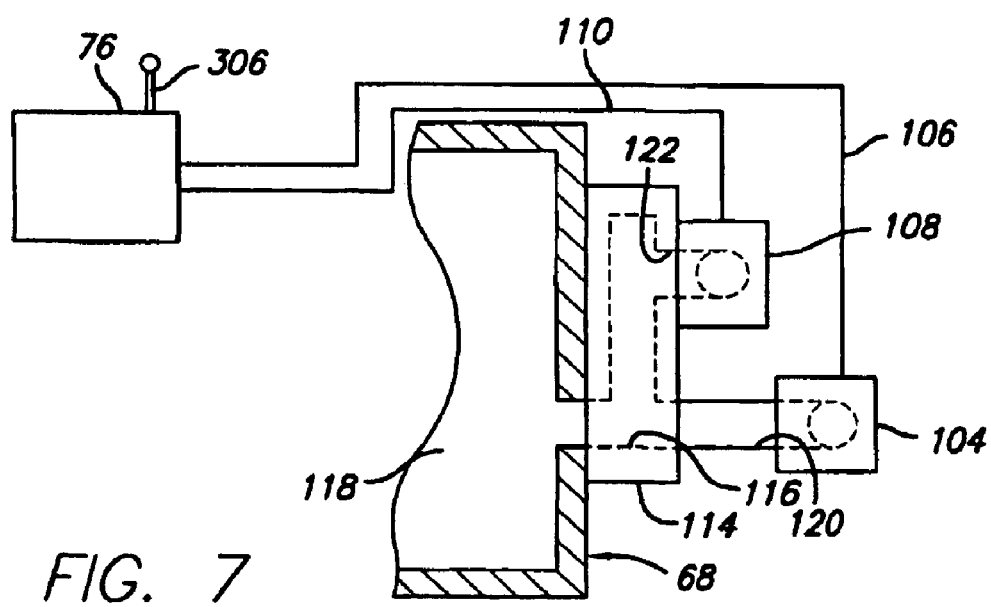
FIG. 7 is a partial fragmentary top plan view taken along 7-7 in FIG. 6.

With reference to FIGS. 6 and 7, the beverage container 68 may further include a manifold 114. The illustrated manifold 114 includes a primary passage 116 which communicates with an interior cavity or reservoir 118 of the container 68. Beverage flows from the cavity 118 through the primary passage 116. The solenoid valves 104, 108 communicate with the passage 116. A dispensing passage 120 and a disposal passage 122 communicate with the primary passage 116.

Solenoid valve 104 and 108 desirably are normally closed and require specific activation in order to open the valves. During a dispense cycle the switch or control 100, for example a controllable faucet as shown in FIG. 5, is activated thereby activating solenoid valve 104. When the dispense solenoid valve 104 is opened beverage 124 will flow from the cavity through the solenoid valve 104. Under this condition disposal valve 108 is closed. When beverage must be disposed of, the disposal solenoid valve 108 is opened while maintaining the dispense solenoid valve 104 in a closed position. This will allow the disposal of beverage through a separate dispensing line.

Disposal of beverage may occur as a result of a time lapsed period whereby after a specified period of time beverage should be disposed of. For example, if a beverage only maintains a desired flavor profile or other characteristics for a period of time, for example 2 hours, at the end of two hours after the beverage brewing cycle is initiated, the beverage may be disposed of through the disposal valve 108. Such disposal may also be used at the end of a service cycle such that at the end of the day all beverages may be disposed of at a predetermined time.

The disposal valve may also be used in a manner to flush and cleanse the beverage brewing system. In this regard, at a predetermined period of time, the controller 76 may operate the disposal valve 108 to dispose of any beverage retained in the container 68. The disposal valve 108 and dispense valve 104 may be closed. The controller 76 may then dispense a quantity of water into the cavity 118 thereby flushing and sanitizing the reservoir. After holding the heated water for a predetermined period of time the water may be disposed through the disposal valve 108. Multiple rinsing or flushing cycles may be controlled by the controller 76. In this regard, both the cavity 118, the container 68 and the associated passages 116, 122, 120 and solenoid valve 104, 108 may be cleansed and sanitize periodically and automatically. It will be appreciated that these automatic cycles will likely greatly increase the cleanliness, taste reliability and sanitation of such beverage dispensing systems as such procedures require considerable amount of time on the part of manual operators.

The use of controllable solenoid valves 104, 108 also prevents dispensing of beverage during a brew cycle. For example, once a brew cycle is initiated the controller 76 can lock out the solenoid valves 104, 108. This will allow for the brewing cycle to complete and brewed beverage to mix within the container 68 to insure consistent flavor.

The beverage dispensing modules 32 can be constructed in any other suitable manner to dispense brewed beverage in any suitable manner in accordance with various embodiments disclosed. If desired, for example, the beverage containers 68 of the beverage dispensing modules 32 can instead be in the form of carafes (not shown) or have any other suitable construction.

In a preferred embodiment, during a brewing cycle, heated water 134 is dispensed from the housing 34 through the water dispensing system. Heated water 134 is used to infuse a beverage brewing substance 136 retained in the brewing assembly 64. An opening 138 is provided in the bottom of the funnel 66 to allow a brewed beverage 140 to flow therefrom. As shown, for example, in previous figures, a brewed beverage container 68 is provided to collect the beverage 140. The beverage container 68 may be of any suitable form.

Figure 8:
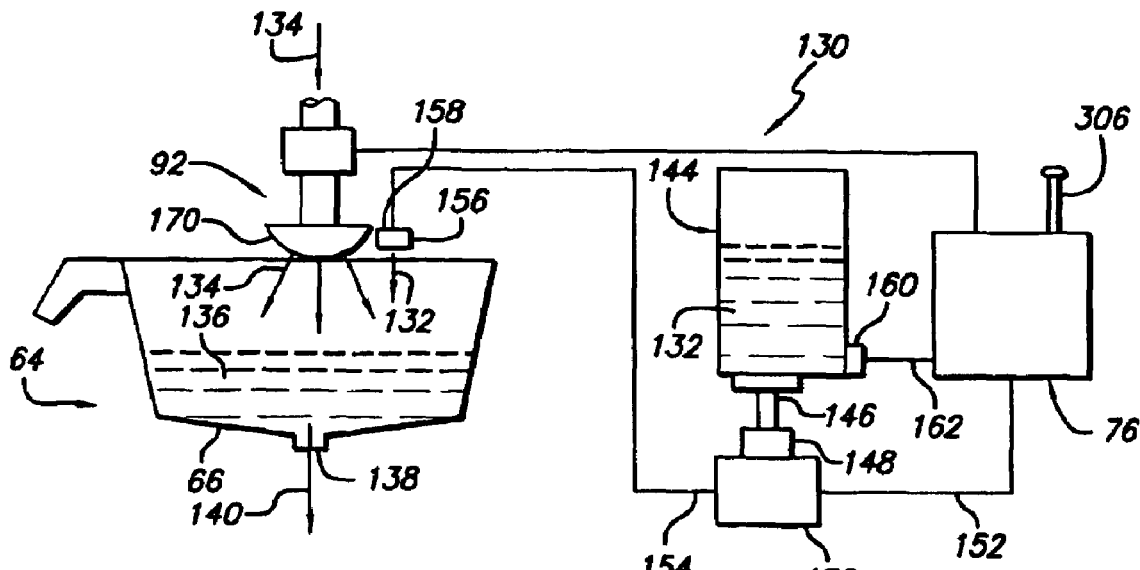
FIG. 8 is a diagrammatic illustration of a liquid flavor distributing system.

With reference to FIG. 8, a liquid flavor dispensing system 130 may be employed with the modular beverage dispensing system disclosed. The liquid flavor dispensing system 130 can have any suitable configuration and can be used to supply flavoring 132 to all or less than all of the beverage dispensing modules 32. The liquid dispensing system 130 may also be used to supply a different flavoring 132 to each of the different beverage dispensing modules 32. Additionally, the flavorings 132 can be supplied to the beverage dispensing modules by a single liquid flavor dispensing system 130 or several liquid flavor dispensing systems. Further, the flavoring 132 may in the form of the typical flavorings associated with brewed coffee or instead be in any other suitable form such as, for example, honey, peach, lemon, herbal flavors, or any other suitable flavoring which might be desired by a beverage consumer for any number of different beverages.

In a preferred embodiment, a small quantity of flavoring 132 is introduced into the water which is dispensed to the beverage brewing substance 136. The beverage brewing substance may be in the form of decaff or regular ground coffee as well as tea substances or other substances which might be used in an infusion beverage brewing process. The objective in using the liquid flavoring material 132 is to introduce a small quantity of concentrated material or substance 132 during the brewing process so that the flavor becomes fully mixed with and saturated in the heated water 134. Introduction of the flavor 132 early in the brewing process will help assure that the flavor fully mixes with the water, is fully flushed through the beverage brewing substance to maximize the value of the flavor and is used to produce an aroma which might entice purchasers of the beverage as part of the beverage purchasing experience. The flavor could also be dispensed into the beverage brewing substance and subsequently mixed with the water and the resultant brew during the brewing process.

A benefit of adding flavors at the time of brewing and/or mixing soluble beverages, over using pre-flavor beverage substances, is the increased effectiveness of the flavorings. The increased effectiveness of the flavorings reduces the amount of flavoring required to produce a desired taste profile. Under these circumstances, the flavorings are mixed with the beverage substance under optimal conditions to maximize the flavoring benefits of the flavorings. For example, the time prior to mixing the flavoring with the brewing substance is nominal thereby virtually eliminating any degradation of the flavoring which might occur if the flavoring was exposed to air.

A liquid flavor dispensing system 130 is illustrated diagrammatically in FIG. 8. With this embodiment, the liquid flavor dispensing system dispenses a different liquid flavoring 132 in a controlled manner to several of the brewing assemblies of the beverage dispensing modules 32. The flavor can be dispensed to a water or liquid distribution system which controllably dispenses water to a beverage making substance, the beverage making substance or both.

Figure 9:
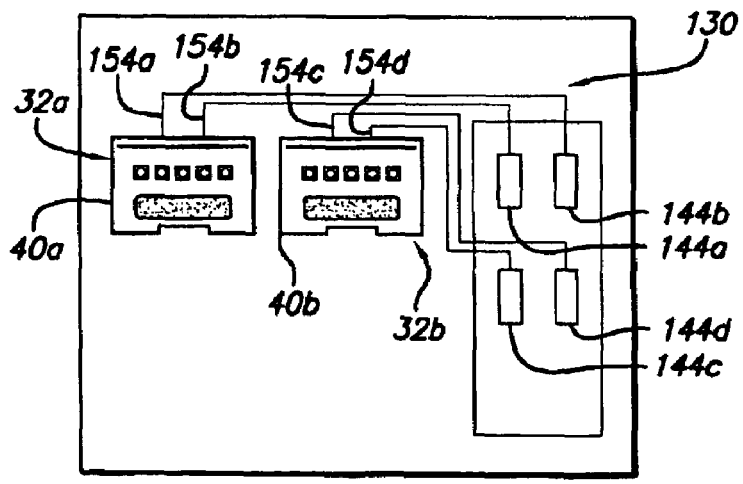
FIGS. 9 and 10 are diagrammatic illustrations of the arrangement of liquid flavor distributing systems.
Figure 10:
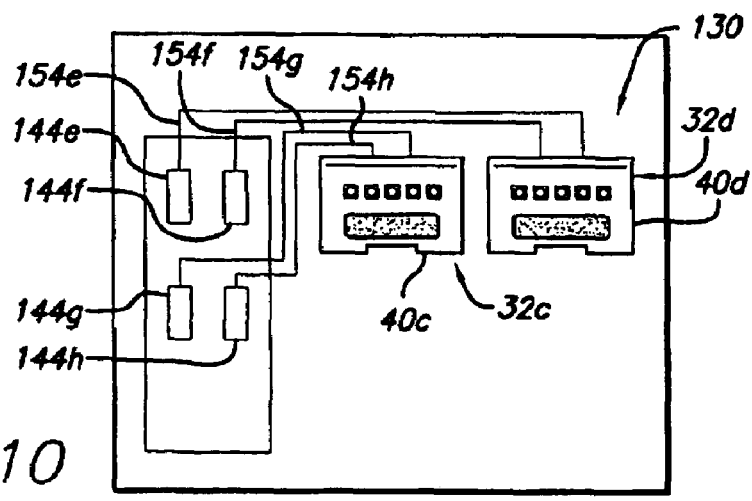

With reference to FIGS. 8-10, the illustrated liquid flavor dispensing system 130 desirably includes a plurality of packages or containers 144a-144h, each of which retains a respective liquid flavor 132 therein. The containers 144 desirably are in controlled communication with respective beverage dispensing modules 32a-32d in any suitable manner. For example, a section of tubing or other passage 146 may connect each container 144 to a respective check valve 148. The check valve 148 is part of a respective solenoid or other form of pump device 150 coupled to the controller 76 via a respective line 152. A respective small diameter tube 154 extends from the solenoid pump 150 to a respective second check valve or flavor injection port 156 at a respective terminal end 158 of the tube 154. A respective sensor 160 can be coupled to the controller via a respective line 162 to monitor and detect a low level of the respective flavoring 132 in the respective container 144. As will be described in greater detail below with regard to sensing and monitoring, the status of the flavorings 132 can be reported by the controller 176. The check valves 148 and 156 at each end of each of the tubes 154 provide a sealed line to which the container 144 can be attached.

Also, either alternatively or in addition to the use of the sensor 160, the flavor usage can be inferred based on information collected on a characteristic of the pump such as operation or usage for example, pump actuation. For example, a sensor may be associated with the pump and run time of the pump 150 could be monitored and a calculation made to infer the amount of flavorings remaining in a corresponding flavorings container 144. The system would provide a signal to the operator, such as "check-status" when the level of flavorings approaches, attains or drops below a predetermined level, for example 20% remaining. Such advance warning would give the operator the opportunity to change the flavorings container 144 before it runs out. The advance warning also helps assure that a reasonable margin of error in the inferred calculation is considered and accommodated for.

In use, when a brewing cycle is initiated, the solenoid pump 150 can be activated simultaneous with the initiation of the brewing cycle of one of the beverage dispensing modules or shortly thereafter. A quantity, for example 9 ml for use in brewing ½ gallon of coffee, of liquid flavoring 132 is pumped from the container 144 through the tubing 154. The check valve or flavor injection port 156 is positioned in close proximity to a sprayhead 170 of the dispensing assembly 92. Dispensing of the flavor 132 into the water will allow the flavor to mix with the heated water for brewing substance during the saturation and extraction process. Generally, it is desirable to use the flavoring at the start of the cycle which will result in completely integrating the flavor during the brewing cycle. The process may be repeated with other beverage dispensing modules 32, 32a and, if desired, with other flavors.

The flavor injection ports 156 may, for example, include a check valve of a type as produced by Smart Products. This is a positive pressure inverted check valve which requires positive pressure through the tube 154 to open the valve. Positioning of the injection port 156 in close proximity to the sprayhead 170 results in the benefit of clearing and rinsing the surface as a result of the water vapor and heat during a brewing cycle. Periodic manual cleaning of the sprayhead 170 and injection port 156 helps maintain a clean system.

Desirably, because the injection port 156 is an inverted pressure check valve, physical contact with the tip of the injection port 156 through which the liquid 132 is dispensed does not result in dispensing of liquid 132. Rather, physical contact with the end of the injection port 156 causes the valve to close as opposed to open. The system also prevents the entry of atmosphere into the container 144 or line 154 thereby preventing contamination or degrading of the flavor or quality of the flavorings. This system provides a generally closed system which prevents the flavorings contact with the atmosphere and prevents contamination providing a generally aseptic environment.

Figure 11:
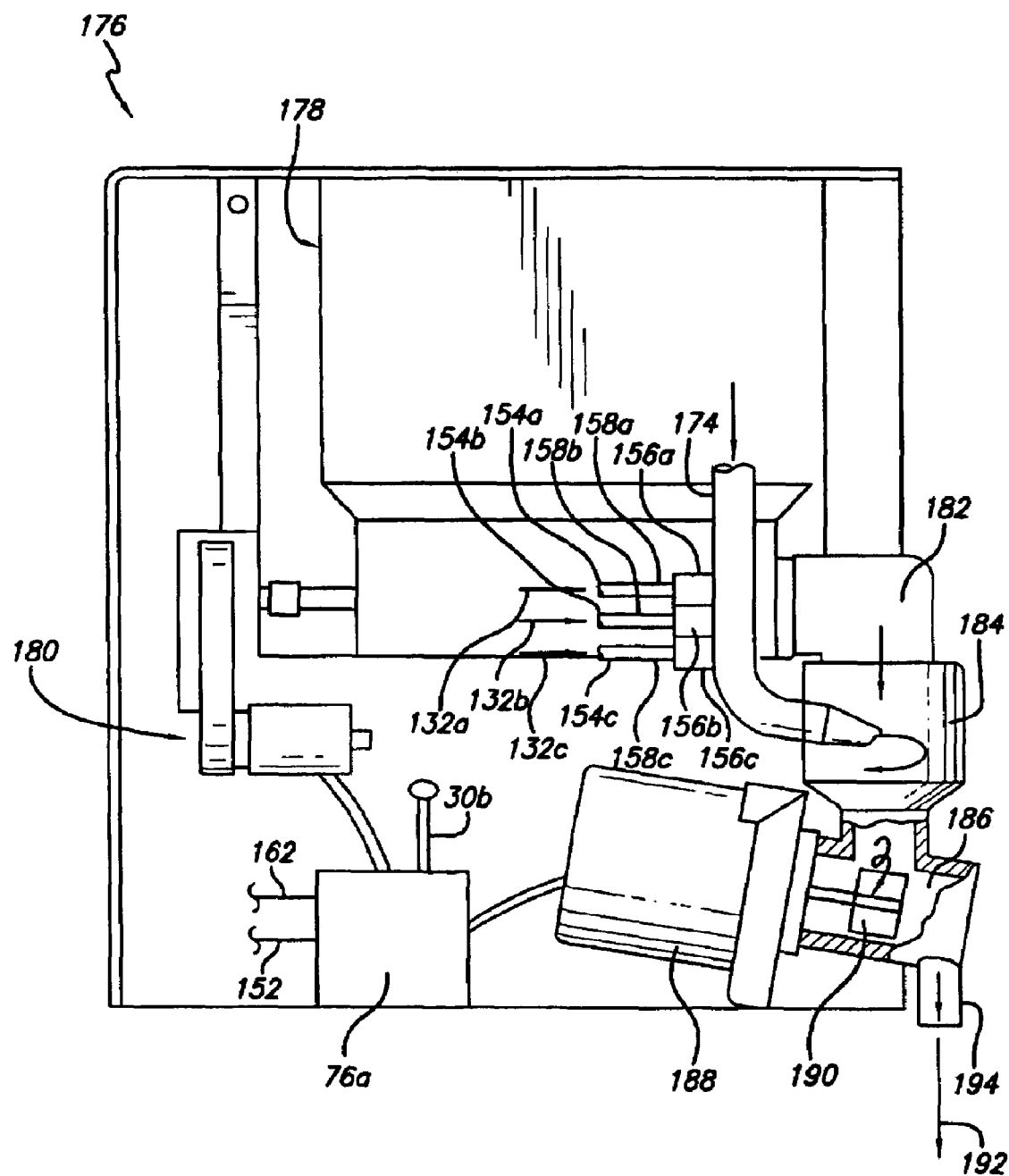
FIG. 11 is a cross sectional view, schematic in nature, of a portion of a powdered beverage, soluble beverage dispensing system including connections to dispense liquid flavor to the soluble beverage production stream.
Figure 12:
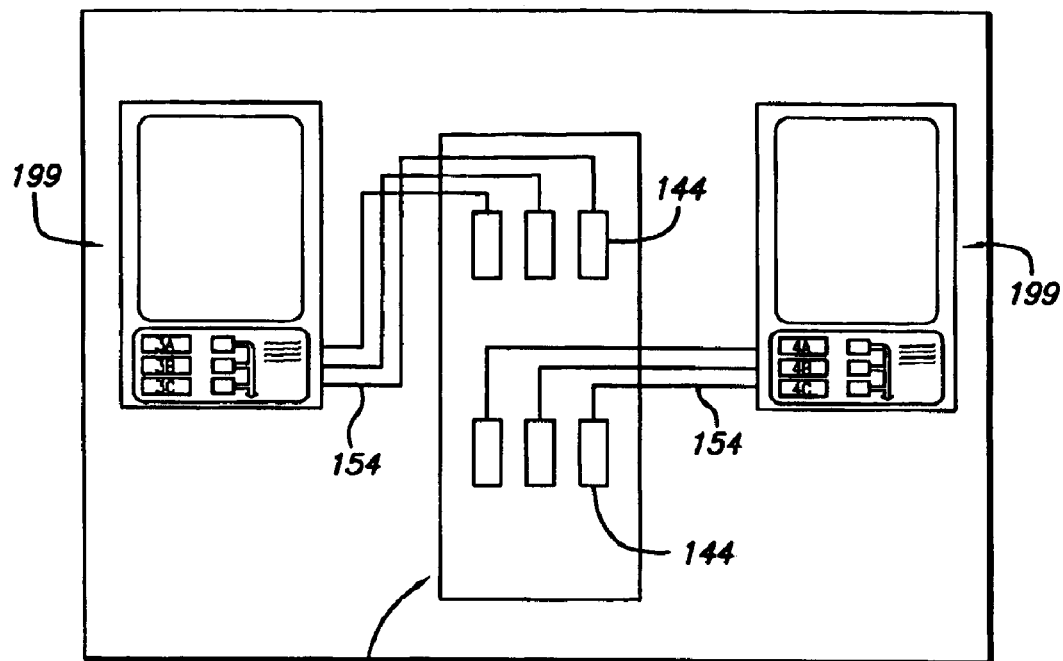
FIGS. 12 and 13 are diagrammatic illustrations of the liquid flavor distributing system coupled to the soluble beverage dispensing system of FIG. 11.
Figure 13:
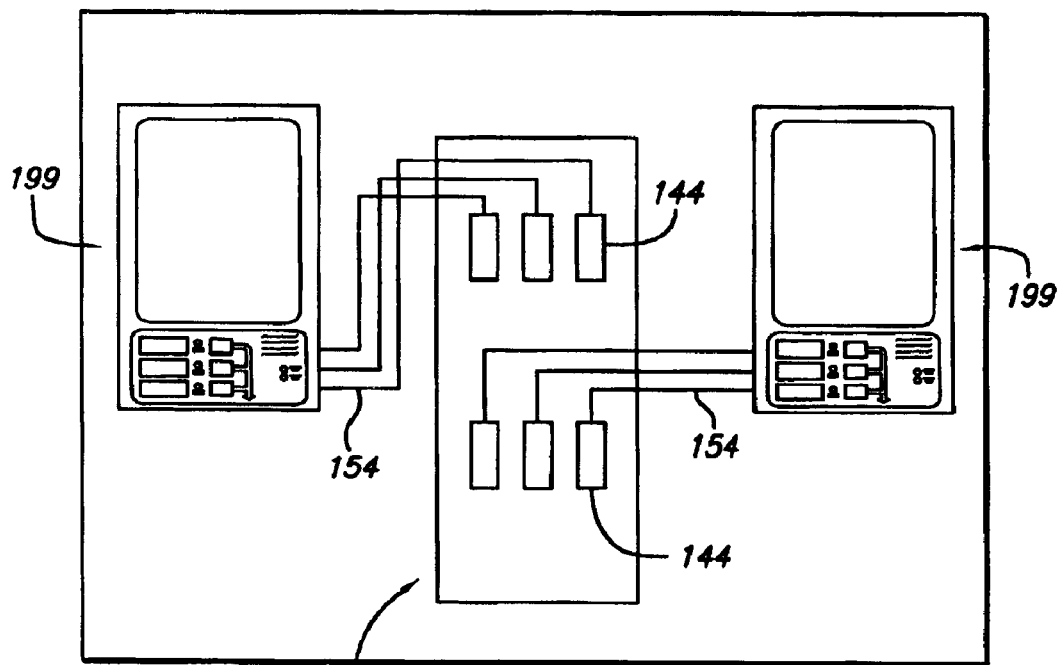

With reference to FIG. 11, the liquid flavor dispensing system 130 as described with regard to FIGS. 8-10 may be used with a soluble beverage system 176. In FIG. 11, the liquid dispensing system dispenses liquid flavor into a hot water path 174 of a soluble or powdered beverage dispensing system 176. The devices used to dispense the liquid flavor are the same as those describe above with regard to FIG. 8. As such, only the terminal ends 158a, 158b and 158c of multiple lines 154a, 154b, and 154c are shown. Similarly, the multiple injection ports 156a, 156b, and 156c are shown.

The soluble beverage dispensing system 176 retains a quantity of powdered beverage mix (not shown) in a beverage dispensing container 178. The dispensing of soluble beverage material in powder form is generally known in the art. The container 178 includes a dispensing auger (not shown) which controllably dispenses powder by operation of a dispensing drive or motor 180 controlled by the controller 76a. Powdered beverage material is dispensed through the passage 182 into a mixing chamber 184. The hot water line 174 communicates with the mixing chamber 184 to combine with the powder. The combined powder and hot water flow into an agitating chamber 186 there below. A whipper motor 188 and agitating blade 190 further blend the powder and water combination for dispensing a beverage 192 through a nozzle 194.

The flavor dispensing system 130 (see, FIG. 8) controllably dispenses liquid flavor 132 from respective containers 144 using corresponding pumps via the lines 154a, 154b, and 154c. Either individual flavors or combinations of flavors may be dispensed into the hot water line. Such dispensing may be programmed in the controller 76a. Positioning of the injection ports 156a, 156b, 156c in the heated water path helps to assure that the liquid flavors are rinsed from the injection ports during and at the conclusion of the heated water dispensing cycle during a beverage dispensing cycle. It should be noted that generally these powdered beverage dispensing systems have a momentary hot water overrun at the end of the cycle during which powdered beverages dispense from the container 178. The slight overrun of heated water helps to assure that the mixing chamber 184, whipping chamber 186, and nozzle 194 are rinsed clean at the end of the cycle. The injection ports 156a, 156b and 156c have been positioned in the hot water line to provide the rinsing characteristics and benefits of the overrun of hot water. Furthermore, it is commonly known to have at least one daily rinse cycle in which heated water is dispensed through the assembly 176 to maintain cleanliness and sanitation of the system.

During a brew cycle as shown in FIG. 8, liquid flavor is generally preferably dispensed at the initiation of the brew cycle. As noted, this helps to ensure complete mixing and optimal extraction of the flavor from the beverage brewing substance 136. A predetermined volume of liquid flavor 132 can be dispensed into the brewing assembly 30 at the initiation of the brew cycle.

In contrast, the soluble system 176 as shown in FIG. 11 may have a variable quantity of beverage 192 dispensed therefrom. It is anticipated that multiple beverage sizes may be dispensed from the soluble system 176. As a result, the liquid flavoring 132 must be dispensed at a rate consistent with the concentration flavor profile or recipe, and powder also dispensed by the system. For example, if a consumer wishes to obtain a 12 ounce beverage the proper amount of liquid flavoring must be dispensed for a 12 ounce beverage. However, the consumer may be allowed to control whether they wish to have a full 12 ounces of beverage or if they decide to short the beverage resulting in, perhaps, only 10 ounces being dispensed. As such, the pump associated with the powdered beverage system 176 must be calibrated to dispense small quantities of liquid flavoring 132 on a per unit time basis to assure a desirable and consistent mixing of flavor with the powder. This will help assure that the desired flavor is achieved regardless of the quantity of beverage dispensed.

The solenoid pump 150 used with the liquid flavor dispensing system 130 is a precision controlled metering pump. It is anticipated that other forms of the metering pump may be used with this system. However, in the present embodiment, the metering pump is controllably operated to dispense very small quantities of the liquid flavor 132. The frequency of the plunger rate, the stroke of the plunger as well as the duration of plunger operation the solenoid pump 150 can be controlled by the controller 76, 76a. As a result, very small quantities of highly concentrated liquid flavor can be dispensed into the beverages 140, 192 during the corresponding beverage preparation process.

As such, precise quantities can be added to provide flexibility and tailoring of the resultant beverages. The system 130 can be calibrated using volumetric guidelines associated with various beverage recipes and flavor materials to match particular flavor preferences, for example for various demographics. As such, a franchise operation can custom blend and configure the flavor of beverages dispensed by the beverage dispensing system to meet and satisfy regional preferences. Additionally, if preferences change over time the system can be modified and calibrated to match those preferences. This adds further flexibility to the beverage system disclosed.

Figure 14:
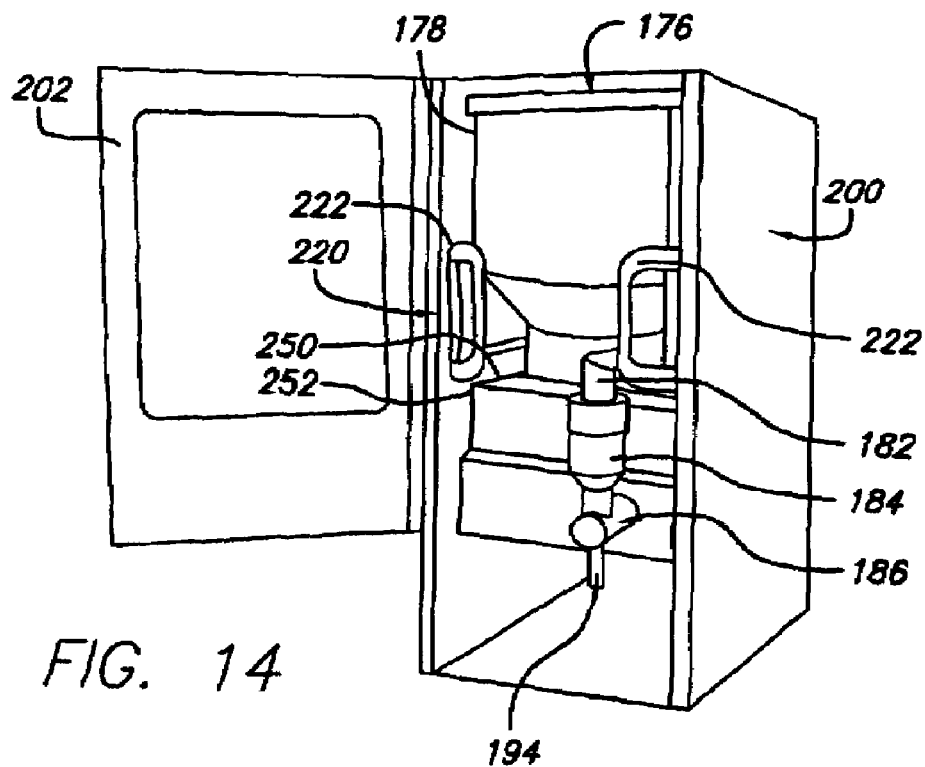
FIG. 14 is a perspective view of a soluble beverage dispenser having a slide-out assembly.

With reference to FIGS. 14-18, a powdered or soluble beverage dispensing system 199 is shown. While a soluable beverage system 199 has been shown and described as a powder dispensing system, it is envisioned that such a soluable system also includes a liquid concentrate system which dispenses a quality of liquid coffee concentrate for mixing with water or other dilution or reconsituting substance. Reference to a soluable beverage system is intended to be broadly interpreted. Such a beverage dispensing system has been generally and diagrammatically shown in FIG. 11. With further reference to FIG. 14, the container 178 is shown positioned inside a housing 200. The passage 182 coupled to the container 178 is shown positioned for dispensing into the mixing chamber 184 and communicating with the whipping chamber 186 and nozzle 194. A portion of the housing 200 in the form of a door 202 conceals the powdered beverage system 176 in the housing 200. Also, the liquid flavor dispensing system 130 as described hereinabove may be used with the powdered beverage or soluble beverage dispensing system 176 illustrated in FIGS. 14-18.

One of the potential difficulties involved with a soluble beverage dispensing system is that the container 178 must be removed periodically for refilling with powdered or soluble beverage substance as well as regular maintenance and cleaning. The container 178 may not be very heavy when it is empty because it is generally formed of a plastic material. However, once filled, it may contain 5 to 10 pounds of powder material. With the container 178 being positioned in an elevated location and containing a quantity of material, it may be difficult to lift the container into a desired position in the housing 200. The container 178 is positioned in an upper position in the housing 200 in order to benefit from gravity assistance when dispensing powdered beverage therefrom to the mixing chamber 84. Additionally, it is important to align the dispensing passage 182 with the housing 184 to help assure that when powdered beverage material is dispensed from the container 178 it flows into the proper path for mixing with water. As such, it would be desirable to provide an apparatus and system for facilitating improved ease of removal and replacement of the powdered beverage container 178 relative to the housing 200.

Figure 15:
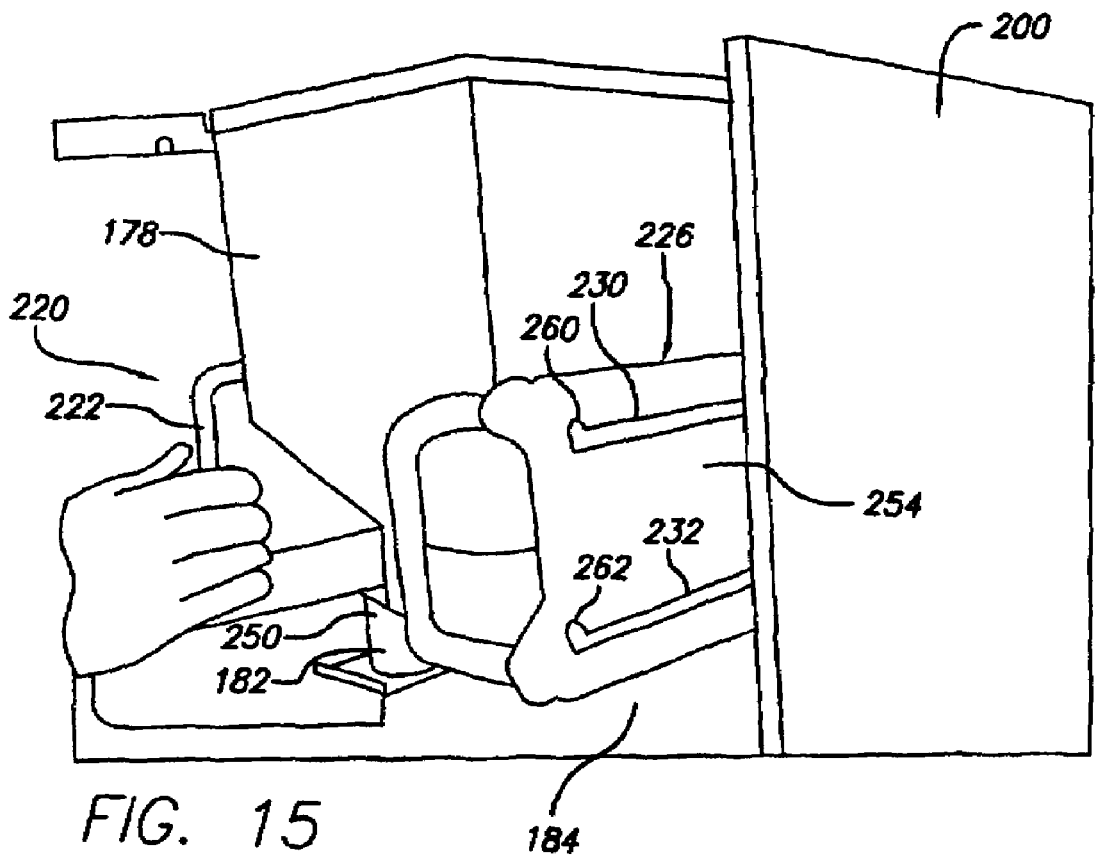
FIG. 15 is an enlarged perspective view of the soluble beverage dispenser of FIG. 14 showing a user removing a container from the soluble beverage dispensing device using the slide-out assembly.

As shown in FIGS. 14-18, a container positioning assembly or container positioner 220 in the form of a slide-out support or shelf is provided. The container positioning assembly 220 includes a pair of handles 222 which can be grasped (see FIG. 15) by a user to extract the container 178 attached to the assembly 220 for removing it from the housing 200. As shown in FIG. 15, the assembly 220 allows the container 178 to be pulled straight out of the housing 200 thereby allowing disengagement of the passage 182 relative to the mixing chamber 184. Movement of the assembly 220 also replaces the container 178 in a desired position to align the dispensing passage 182 with the mixing chamber 184.

Figure 16:
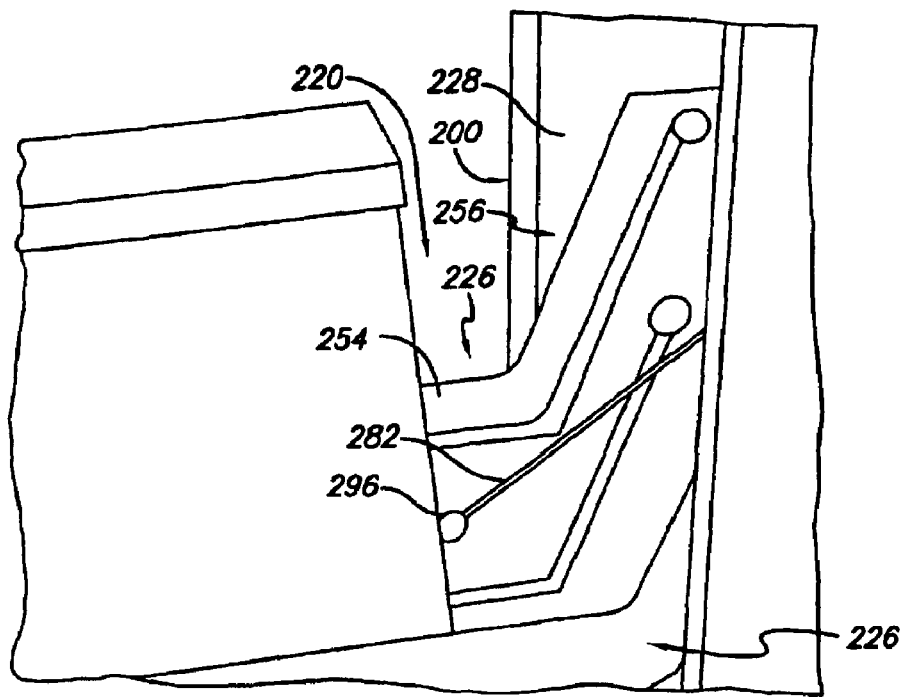
FIGS. 16 and 17 are enlarged views of portions of the slide-out assembly of the soluble beverage dispenser of FIG. 14.
Figure 17:
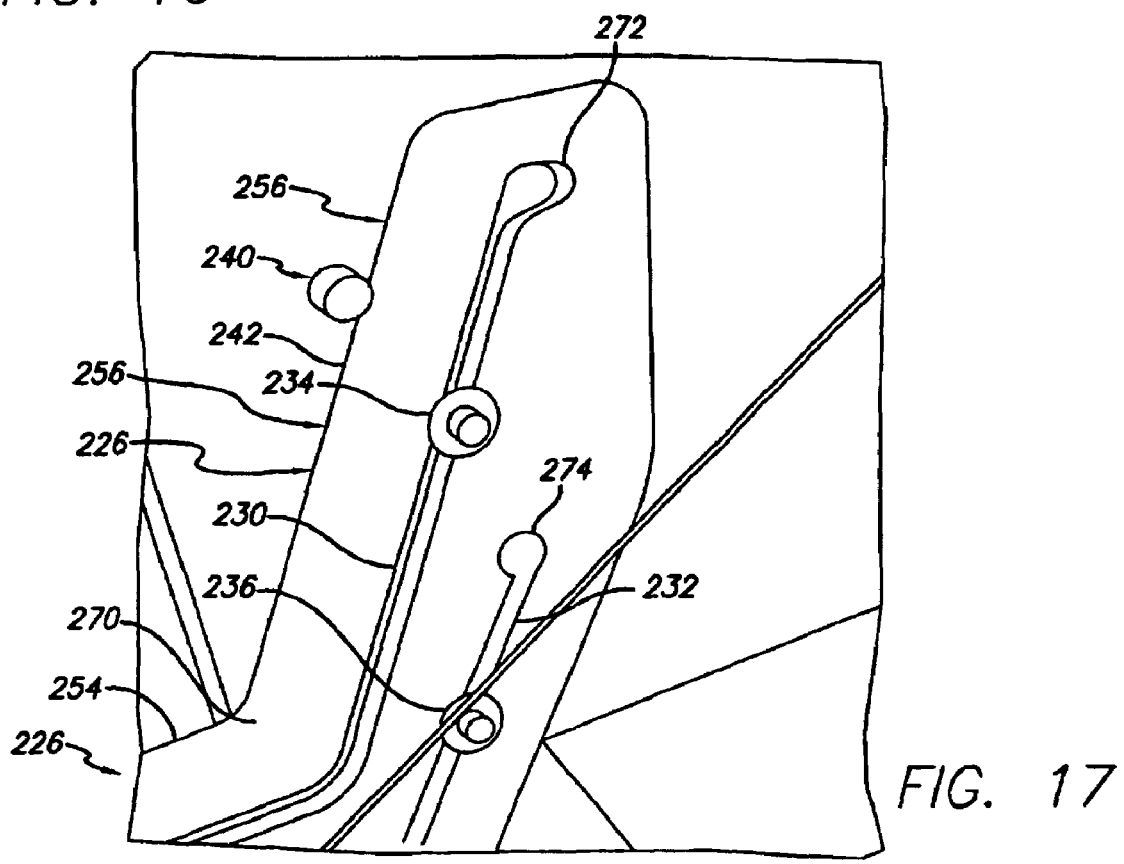

As can be seen in FIGS. 15-17, the container 178 has been removed from the housing 200 in order to refill the container 178 but does not have to be removed from the shelf 250 of the assembly 220. Support rails 226 are positioned on each side of container 178 and are engaged with side walls 228 of the housing 200 (FIG. 15). Each of the guide rails 226 includes a pair of tracking slots 230, 232 which are engaged with corresponding upper 234 and lower 236 guide rollers. A support roller 240 is positioned along an exterior edge 242 of the guide 226 to further help facilitate smooth and controlled movement of the assembly 220. Support rollers 240 and guide rollers 234, 236 are mounted on the sidewalls of the housing 200.

The guides 226 are connected by a cross extending shelf 250 on which the container 178 is positioned. The combination of the guide rails 226 and rollers help the assembly 220 slide outwardly and inwardly relative to the housing 200. FIG. 16 shows only the portion of the guide rails 226 extending past the edge of container 178. The guide rollers 240, 234, 236 associated with the guides 226 prevent tipping of the shelf 250 and associated container 178. When the assembly 220 is stowed in the housing 200 the shelf 250 rests on a corresponding surface 252 of the housing 200. As can be seen in FIGS. 15-17, the guides 226 include a generally horizontal portion 254 and a vertically oriented portion 256. The shelf 250 and container 178 are associated with the generally horizontal portion 254. The generally vertical portion 256 helps to allow forward movement as well as downward movement of the assembly 220 relative to the housing 200. The guide including the portion 254, 256 help facilitate movement of the container into and out of the housing 200 and forward and downward movement.

In the embodiment as shown, the assembly facilitates positioning of the container 178 approximately 6-8 inches downwardly from its stored position in the housing 200. This lowering of the container 178 is beneficial in that it allows for easy filling of the container. Also, by fixing the container to the shelf 250 and the assembly 200 it prevents spilling or otherwise tipping of the container 178 during filling or other processes. This can result in savings in terms of lost beverage material as well as cleanup costs and associated complications.

In the stored position, detents 260, 262 are provided on the guides 230, 232, respectively. The detents 260, 262 allow the rollers 234, 236 respectively, to be engaged therewith to prevent casual disengagement of the assembly 220 from the housing 200. This helps to lock or retain the assembly 220 in a desired stored or stowed position in the housing 200.

As the assembly 220 is moved outwardly from the housing 200, the track guides 234, 236 track along the corresponding channels 230, 232 generally horizontally along the horizontal portion 254. As such, the container 278 attached to the shelf 250 sides forwardly and outwardly from the housing. At a position where the generally horizontal portion 254 transitions into the partially vertical portion 256 (elbow 270) the guides allow the assembly to slide downwardly and forwardly. In the extended most position the guides 234, 236 engage corresponding extended detents 272, 274, respectively. These detent positions 272, 274 help retain the assembly 220 in the outward or extended most position.

Figure 18:
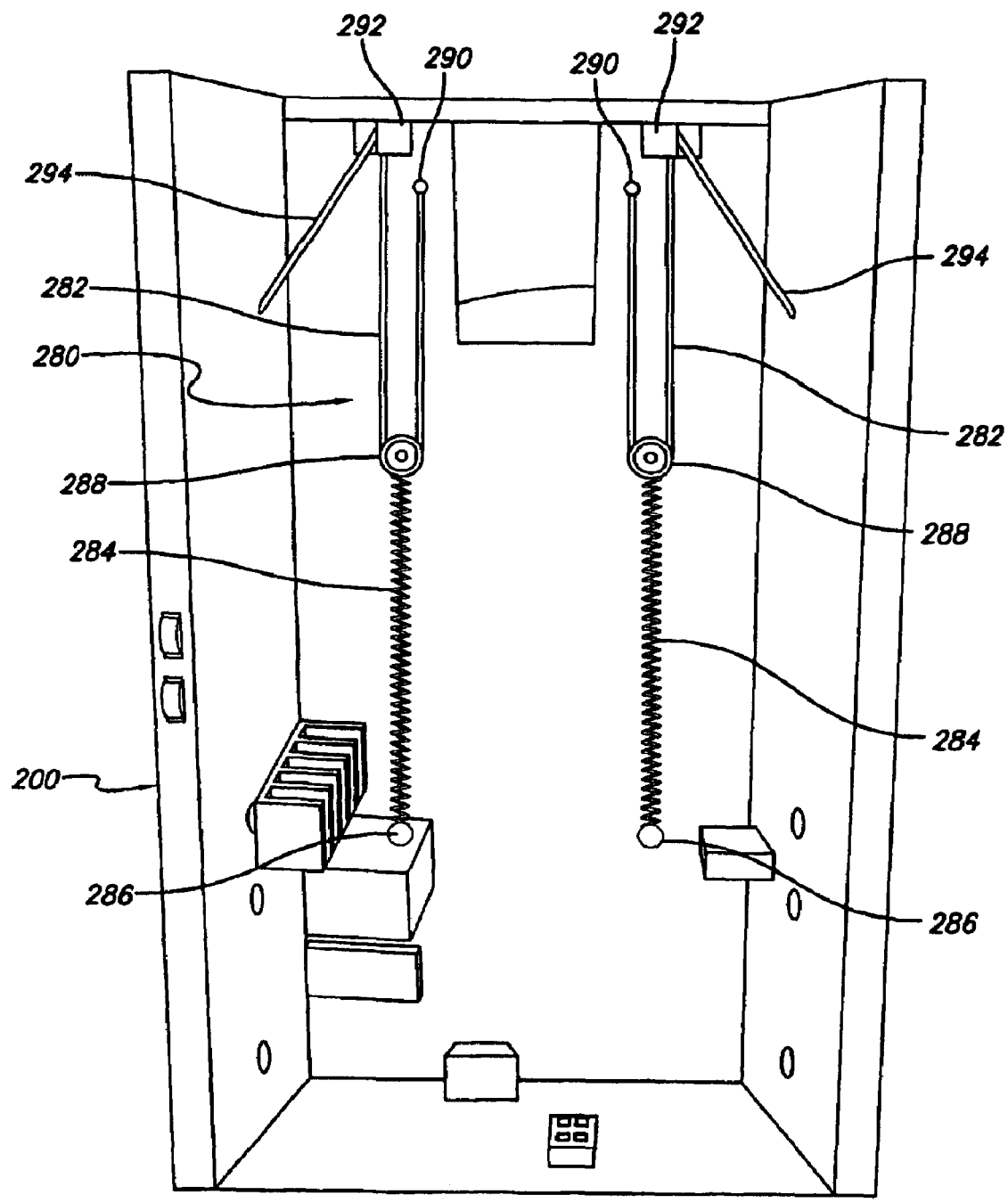
FIG. 18 is a perspective view of a cable and spring leverage system which assists movement of the slide-out assembly relative to the beverage dispensing system.

The assembly 220 also includes an assist system 280 which includes cables 282 and biasing members to springs 284 forming a cable-biasing assembly help facilitate removal of and replacement of the container 178 relative to the housing 200. With reference to FIG. 18, the assist system 280 includes a spring 284 attached at one 286 to a back portion of the housing and at a second end to a first pulley 288. The cable 282 is attached at a first end 290 to a corresponding portion of the housing and extends through the first pulley 288 and up and around a second pulley 292. The second end 294 of the cable 282 attaches to a corresponding portion of the guides 226 at attachment point 296. Attachment of the cable 282 to the guide 226 is shown in FIG. 16. The assist assembly 288 helps further facilitate ease of removal and replacement of the container 178 relative to the housing 200.

For example, when the container 178 is removed from the housing on the assembly 220 the spring 284 stores energy and is stretched as the cables 282 are extended. The cables 282 are extended as a result of the forward and downward movement of the guides 226. Extension of the springs 284 expends the stored energy and imparts a return force in the springs which helps reduce the force required to return the container 178 to the housing 200. This is particularly useful when an empty container is removed from the housing, filled with powdered material and then returned. Returning the filled container 178 normally would require additional effort on the part of the operator and as such the return forces in the assist system 280 help make the return easier.

Figure 19:
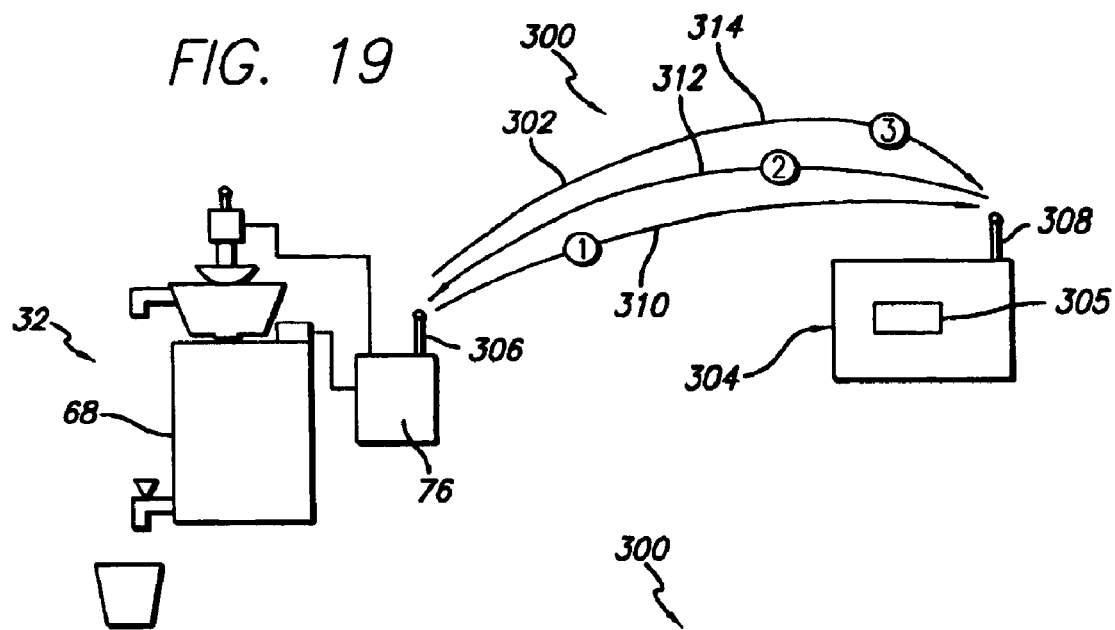
FIGS. 19 and 20 are schematic illustrations of a communication link between a base station and a beverage dispensing device.
Figure 20:
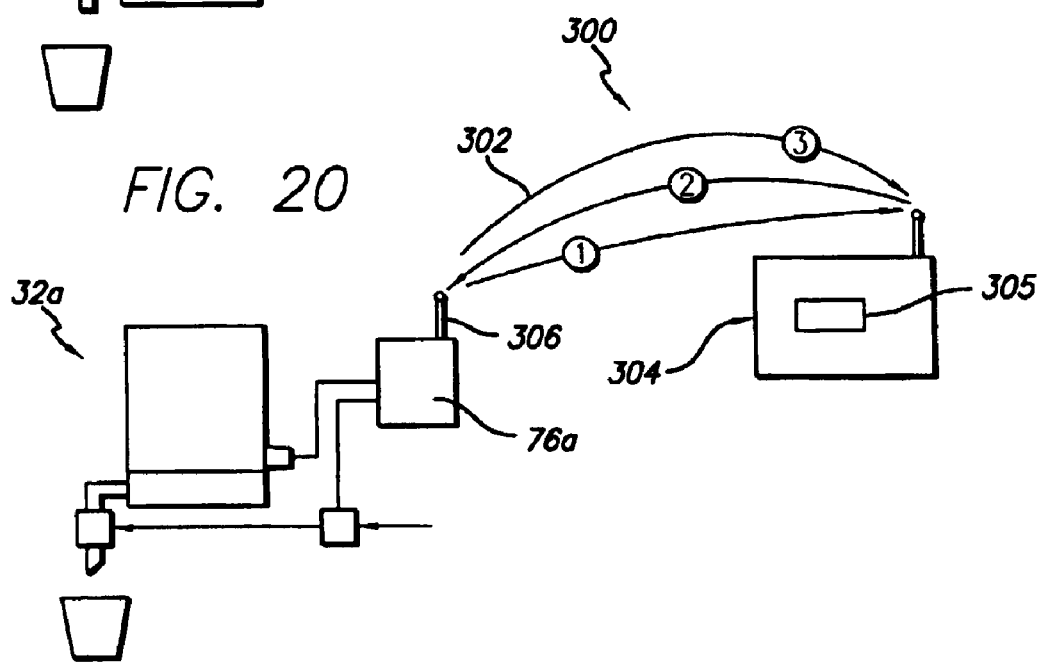
Figure 21:
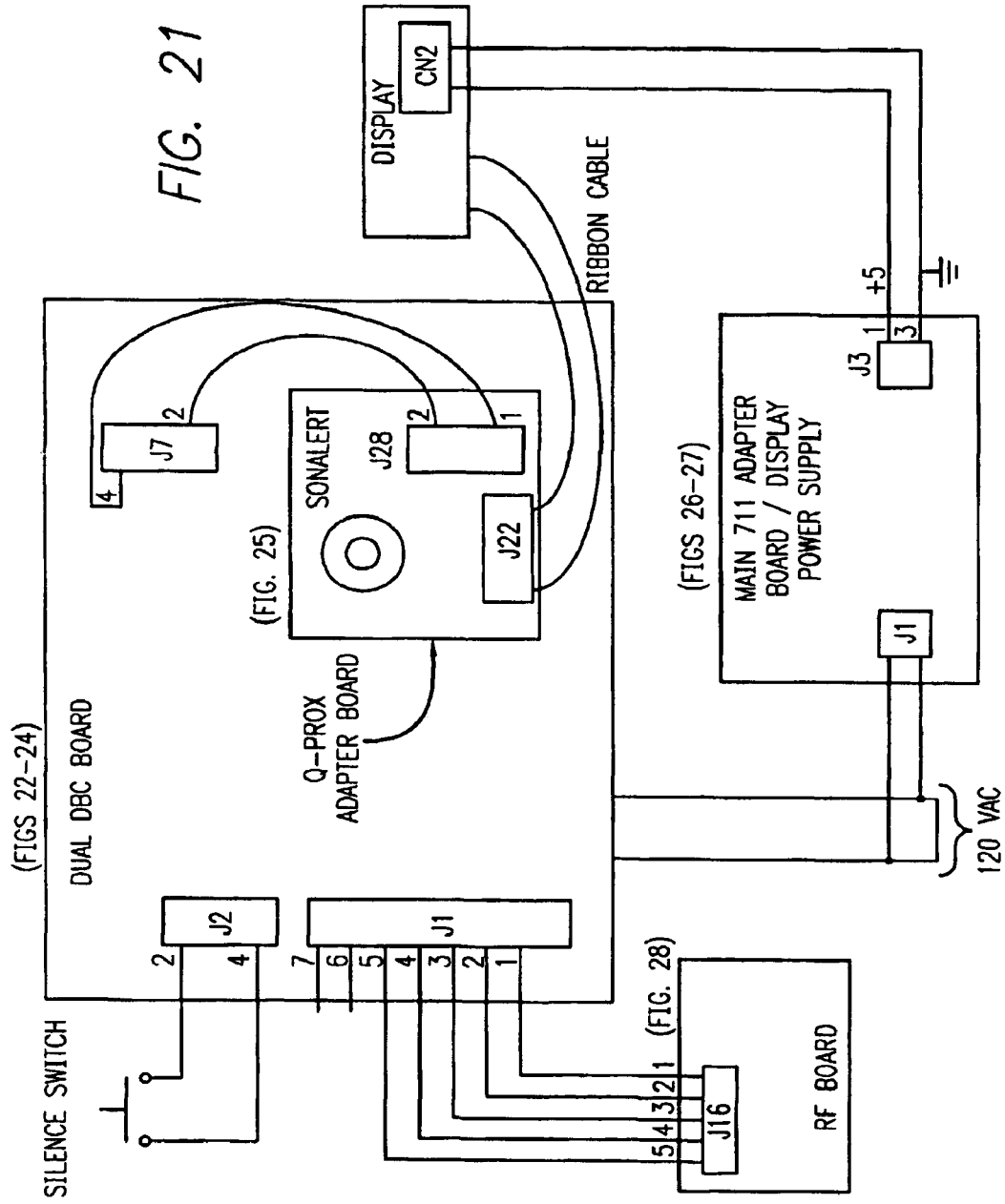
FIGS. 21-28 are schematic illustrations of the circuitry associated with the communication system of FIGS. 19 and 20 and include FIG. 22A, FIGS. 22-22D, FIGS. 23-23D, FIG. 24, FIGS. 24A-24B, FIGS. 25A-25B, FIGS. 26A-26, FIG. 27, FIGS. 27A-27C, FIG. 28 and FIGS. 28A-28E.
Figure 22:
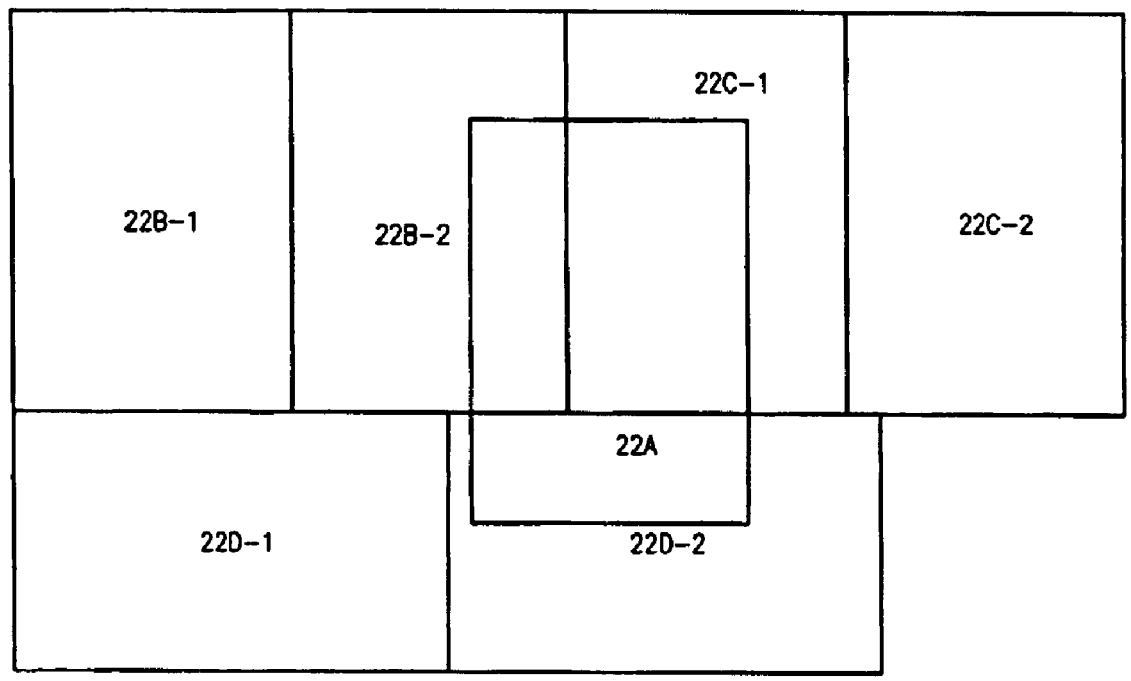
Figure 22A:
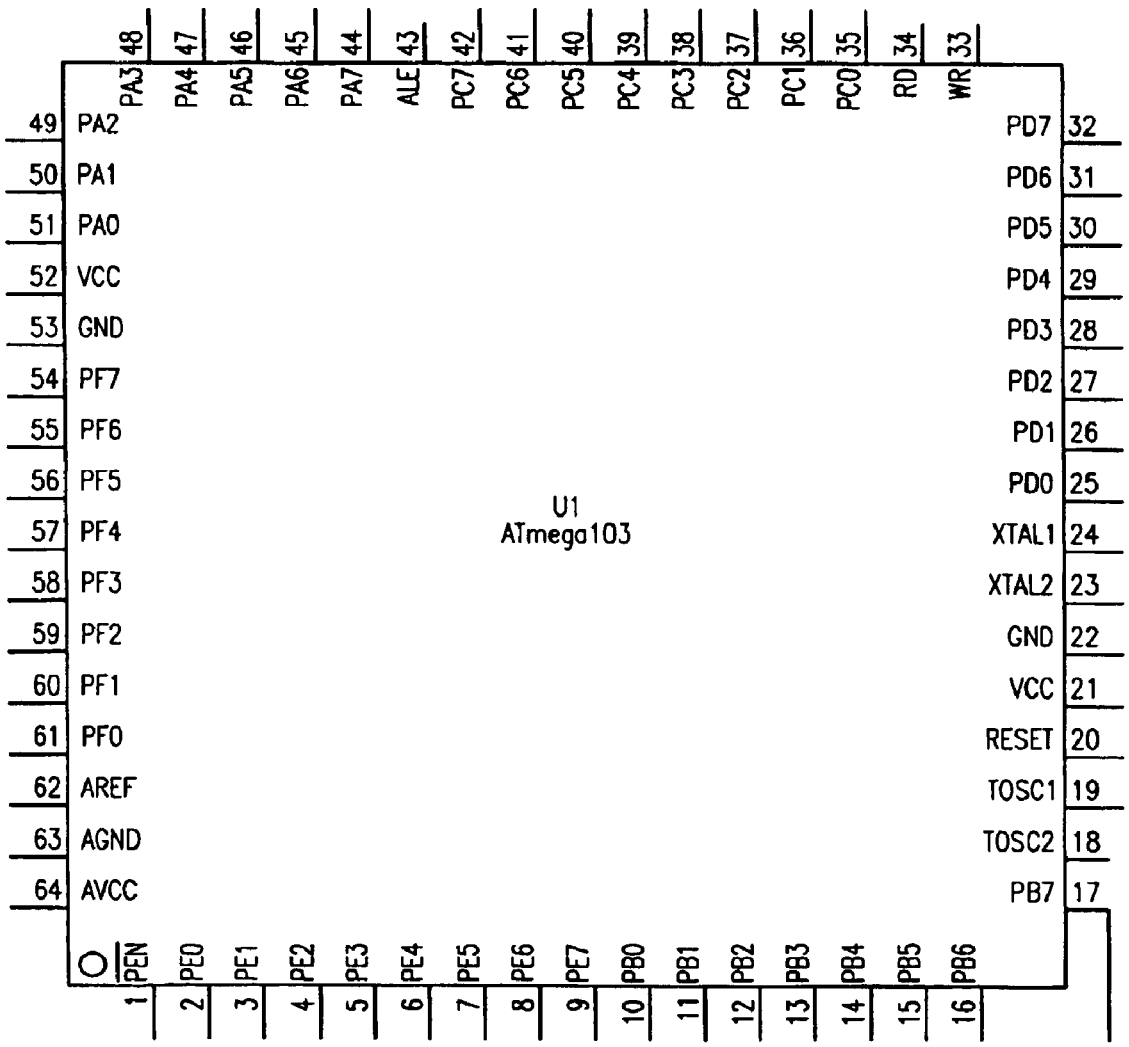
Figures 1, 22B:
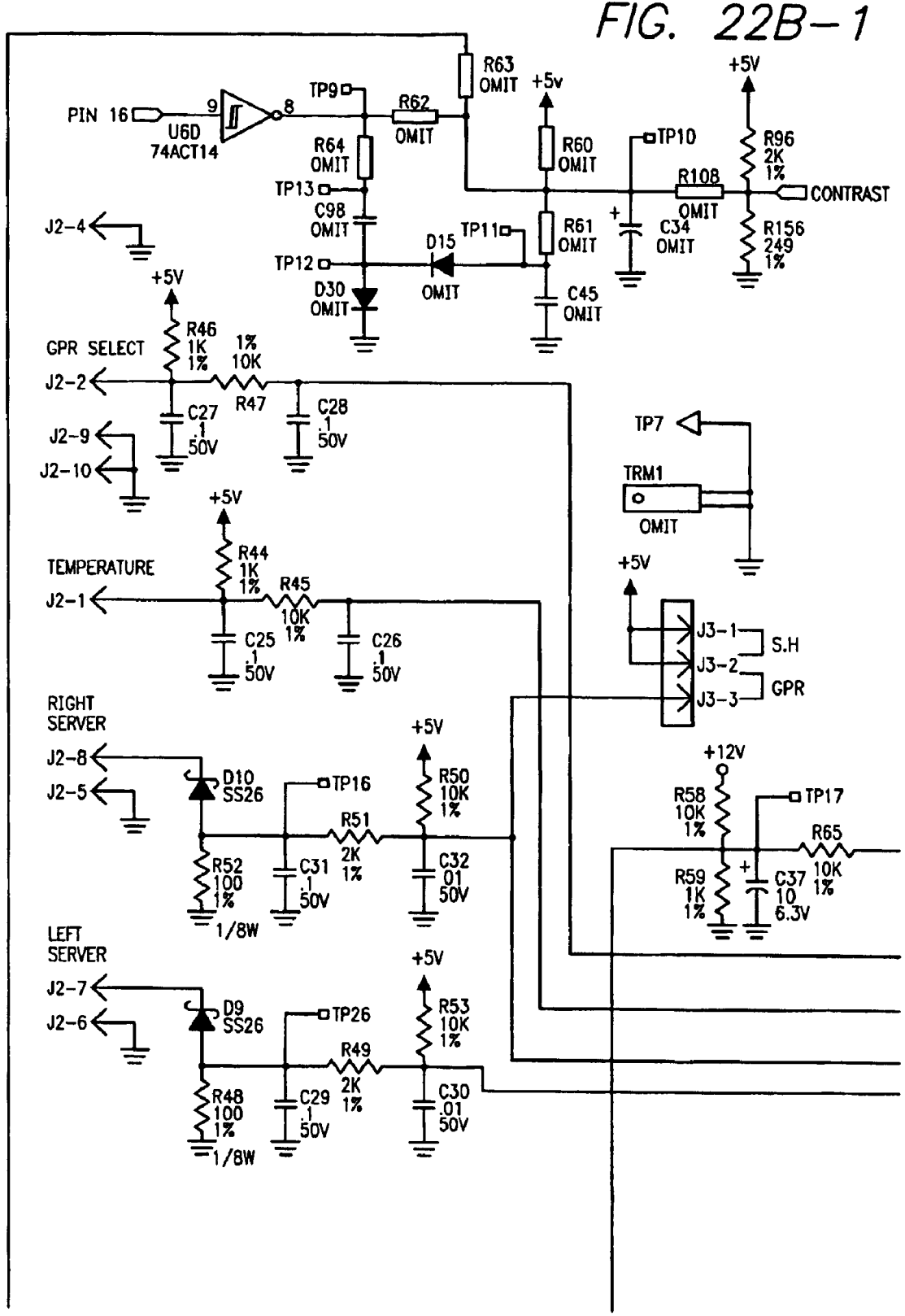
Figures 2, 22B:
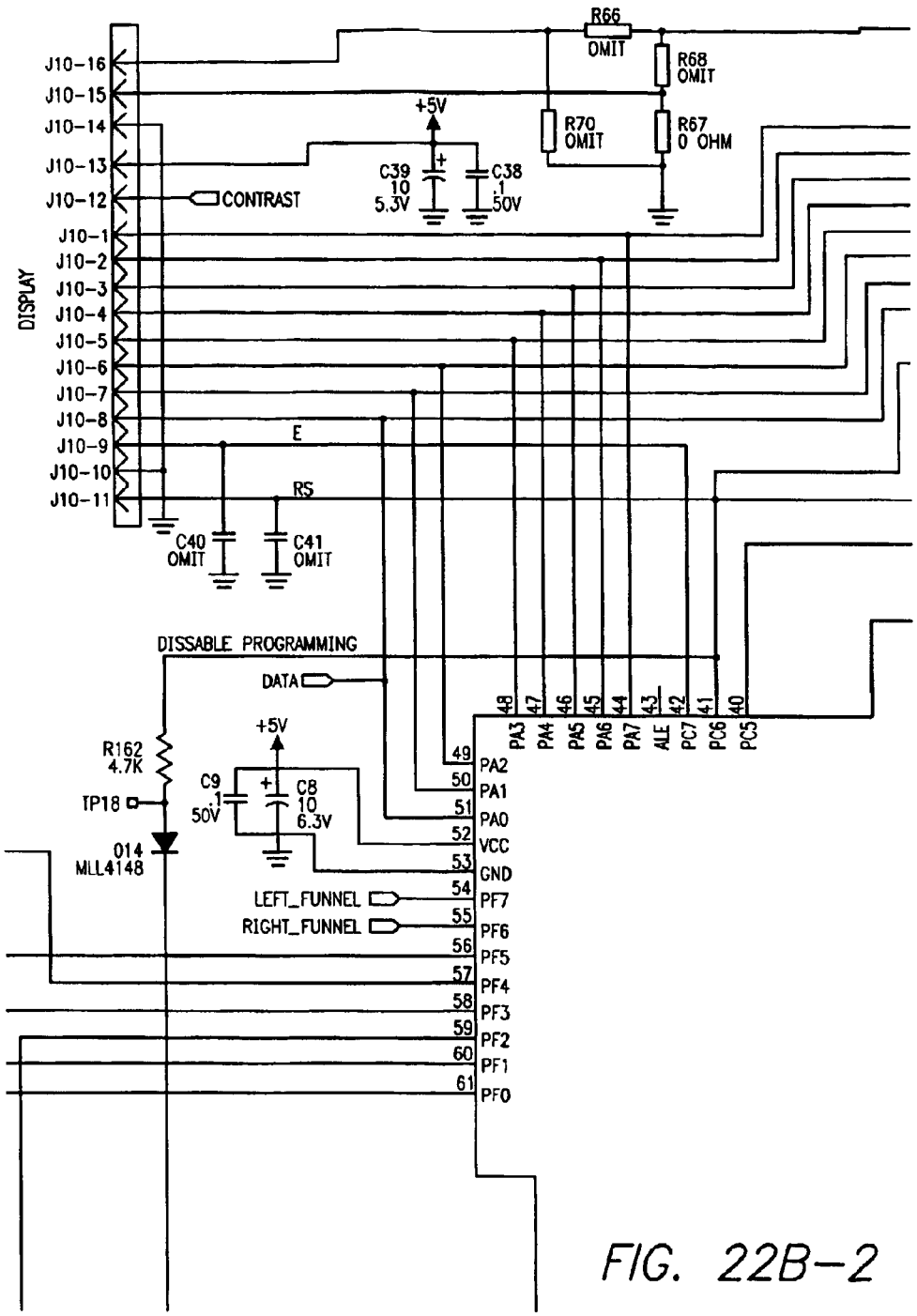
Figures 1, 22C:
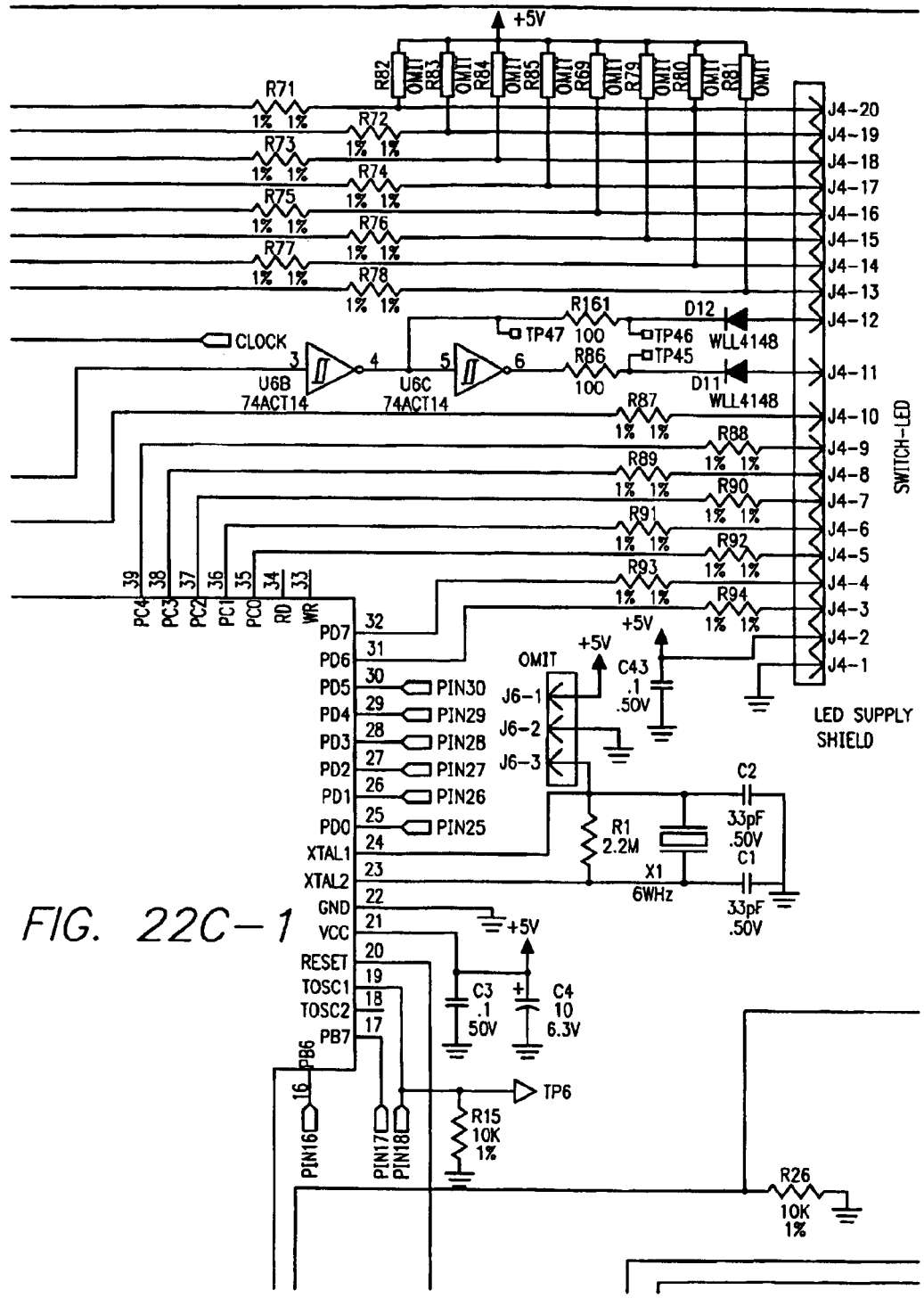
Figures 1, 22D:
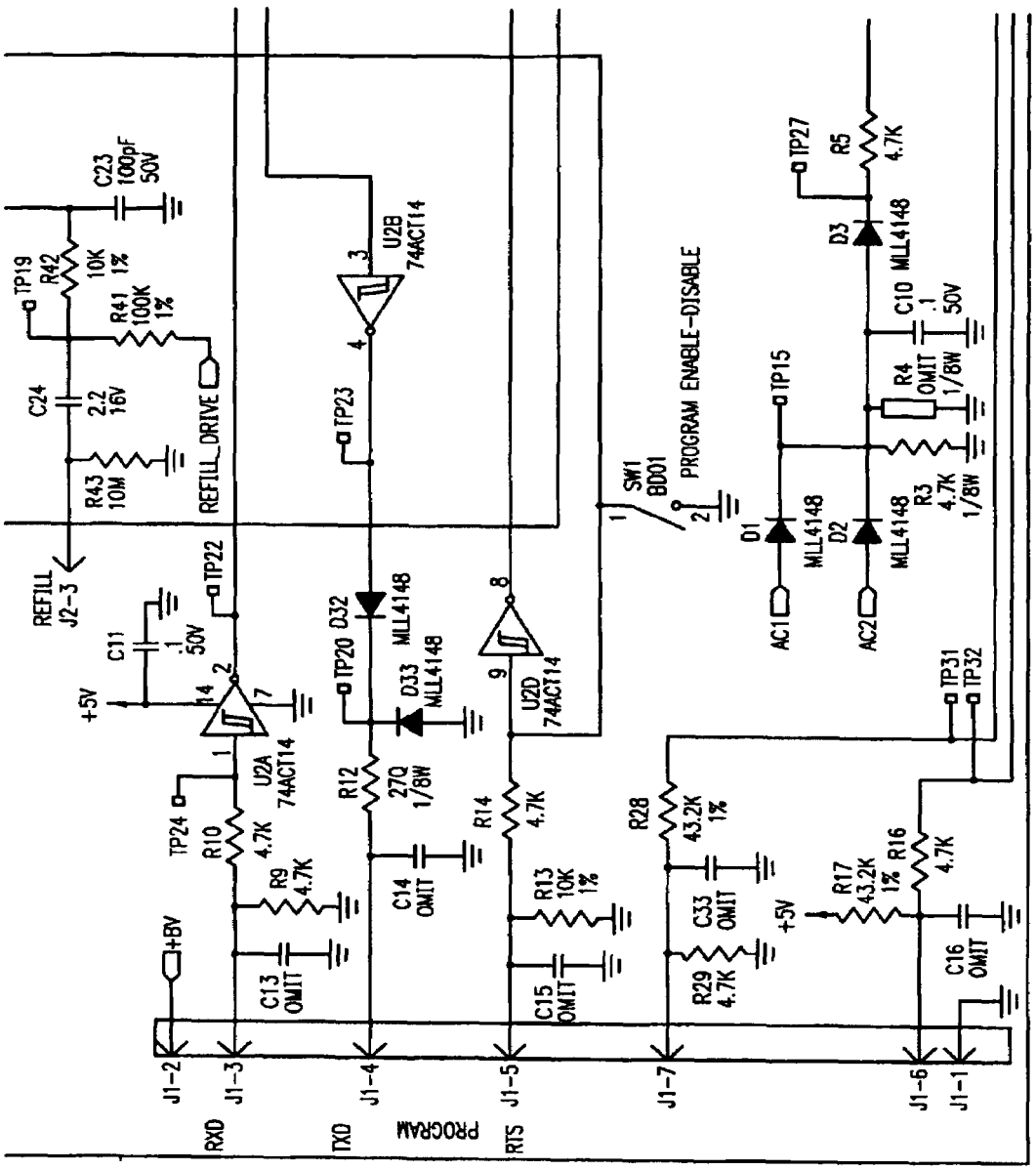
Figures 2, 22D:
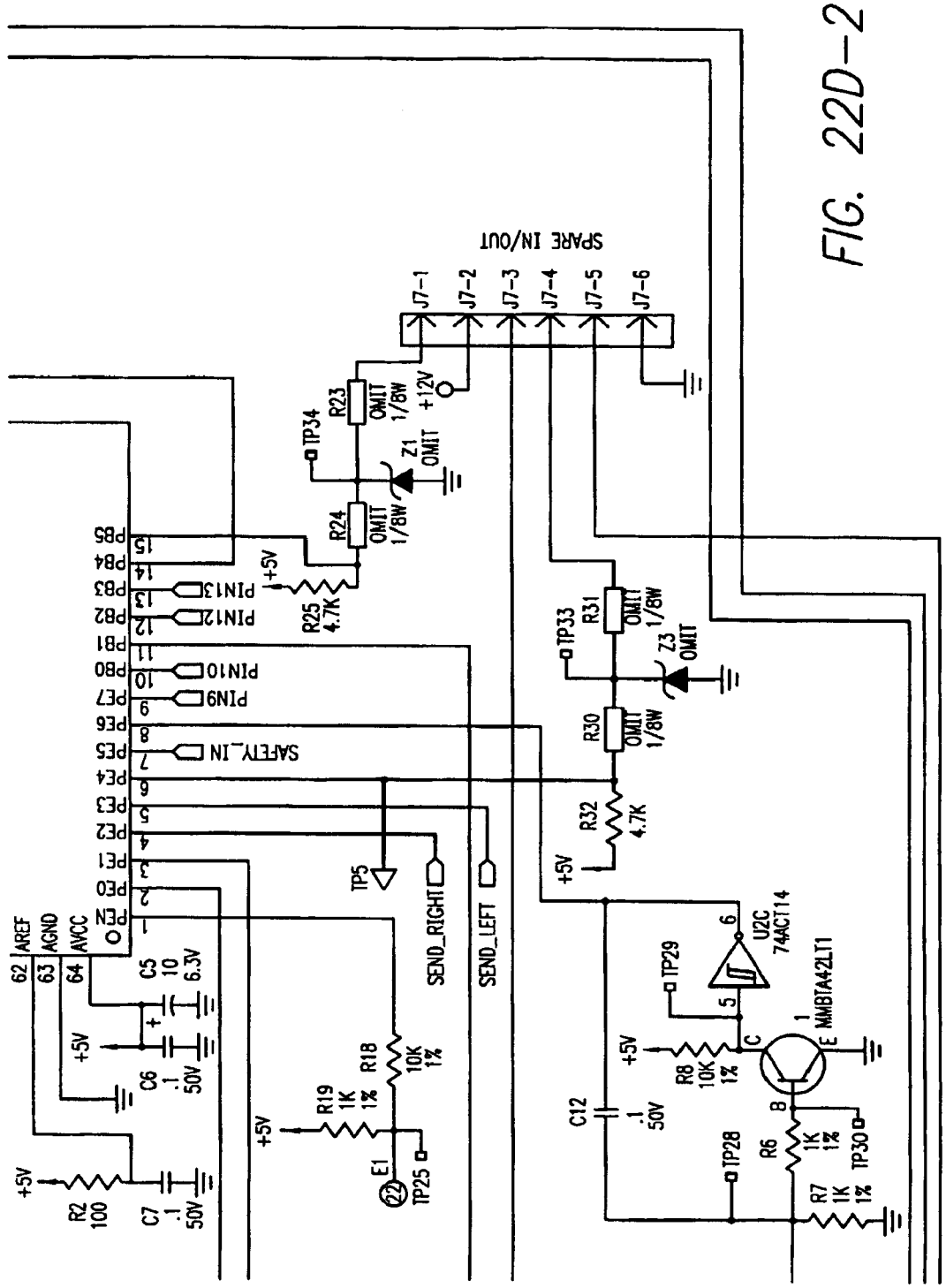
Figure 23A:
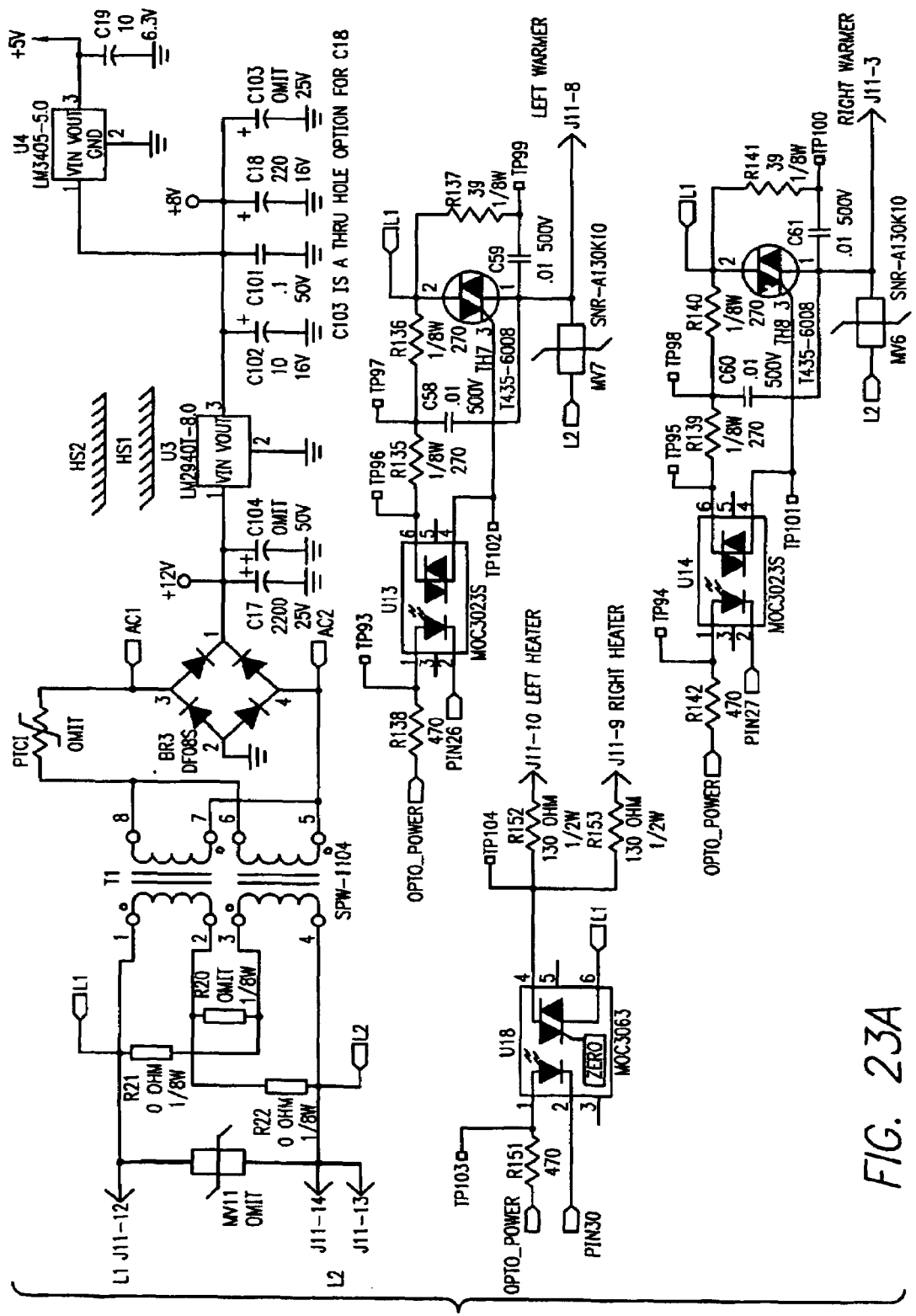
Figure 23C:
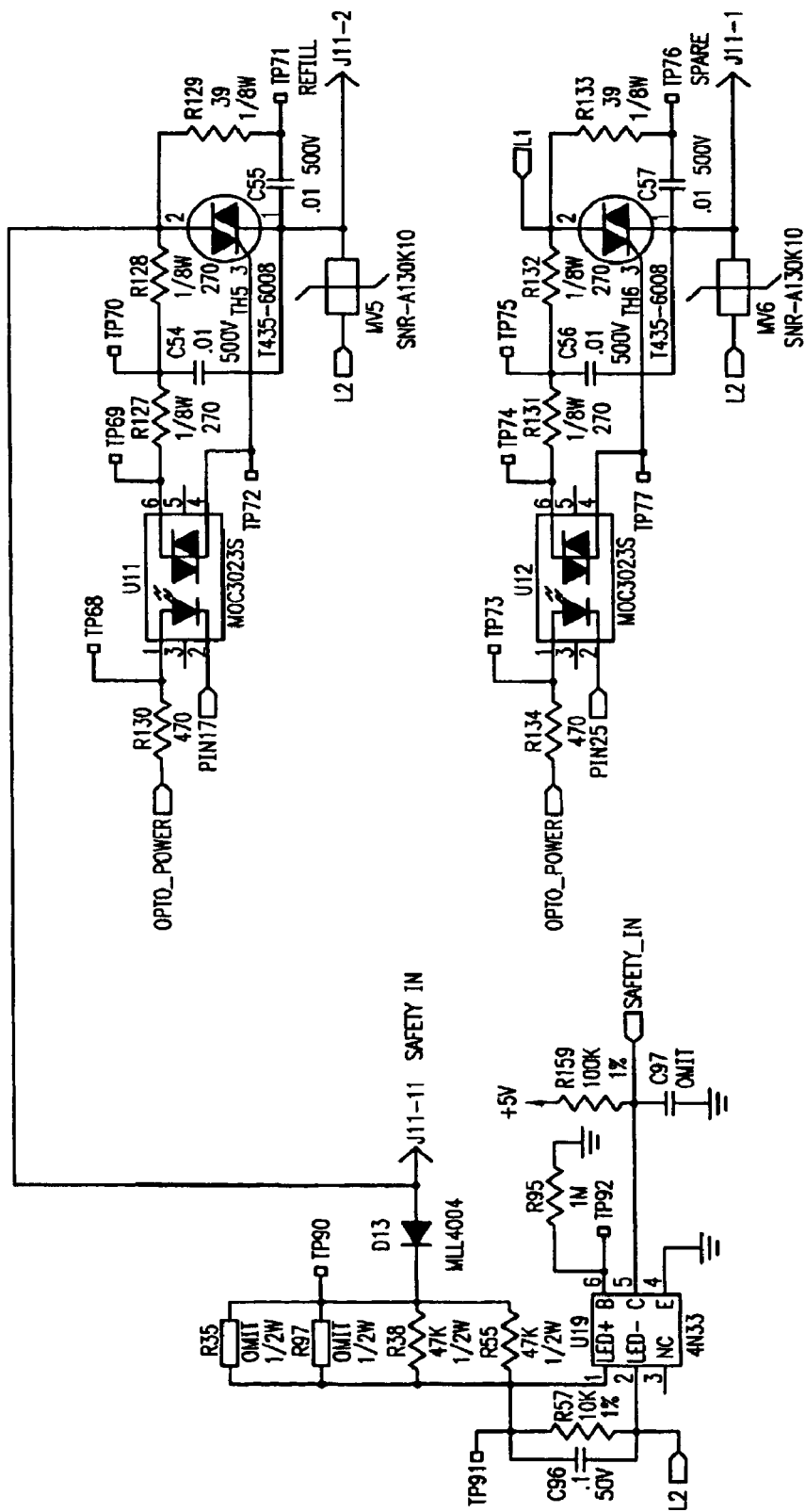
Figure 23D:
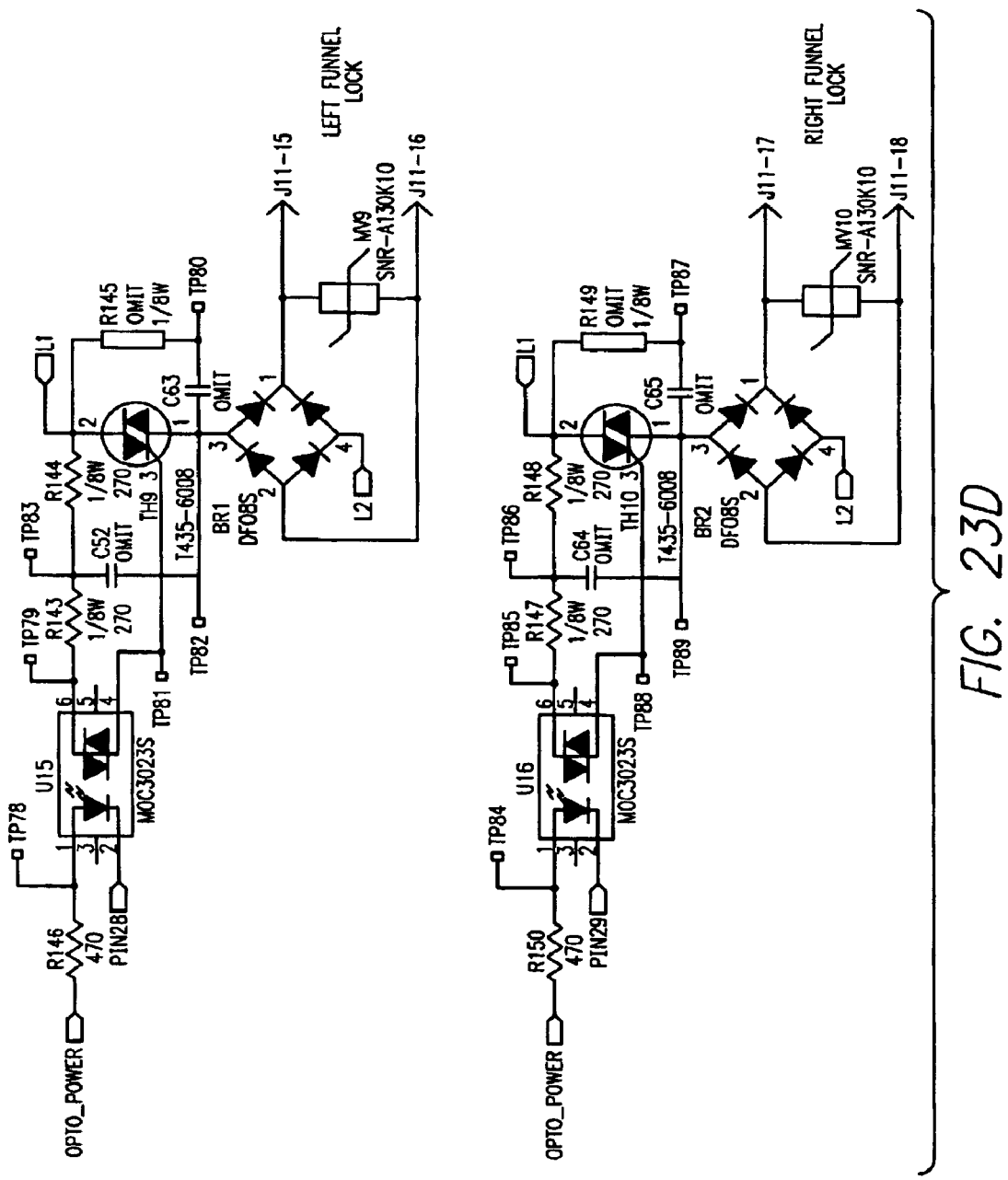
Figure 24A:
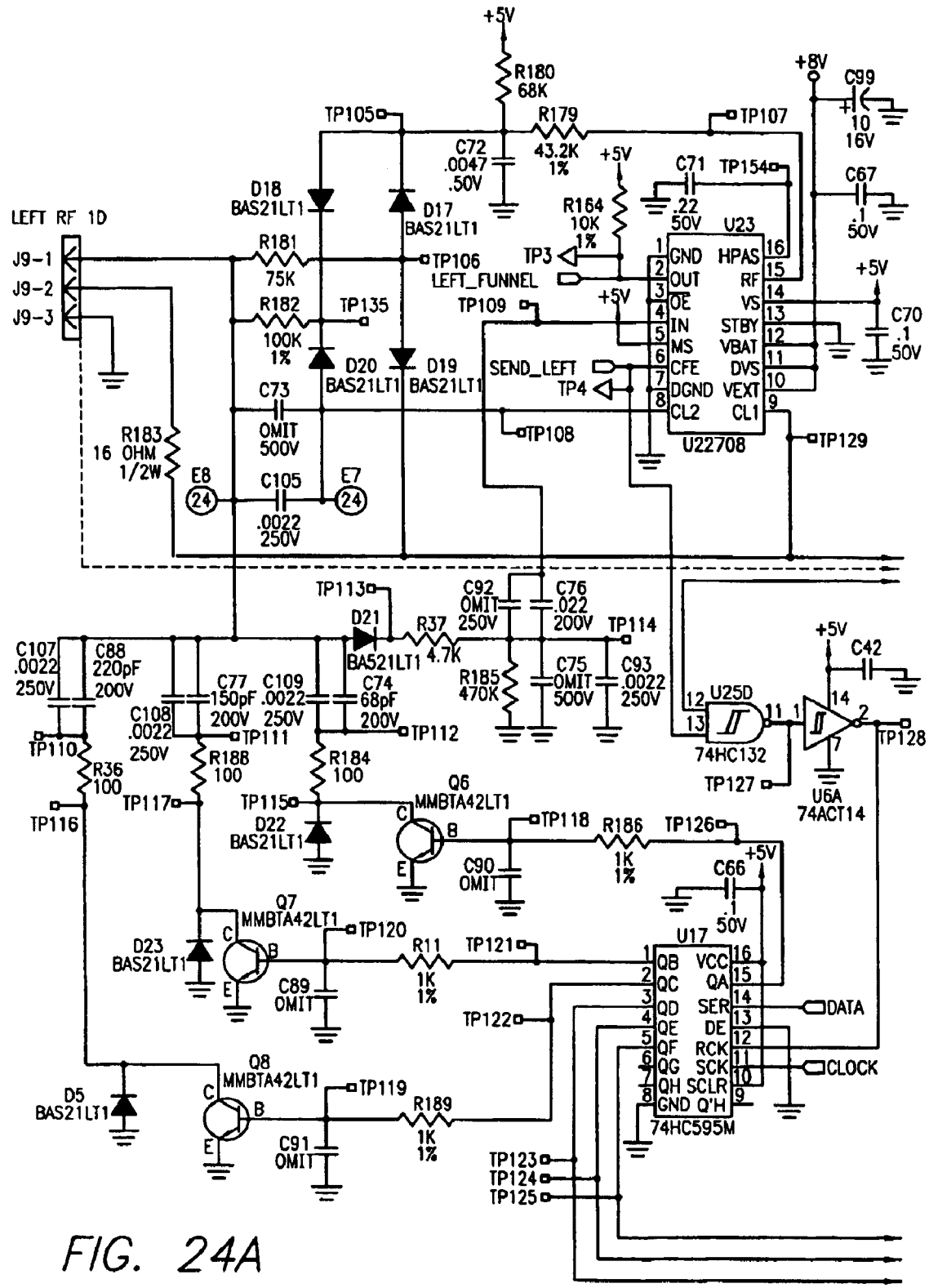
Figure 24B:
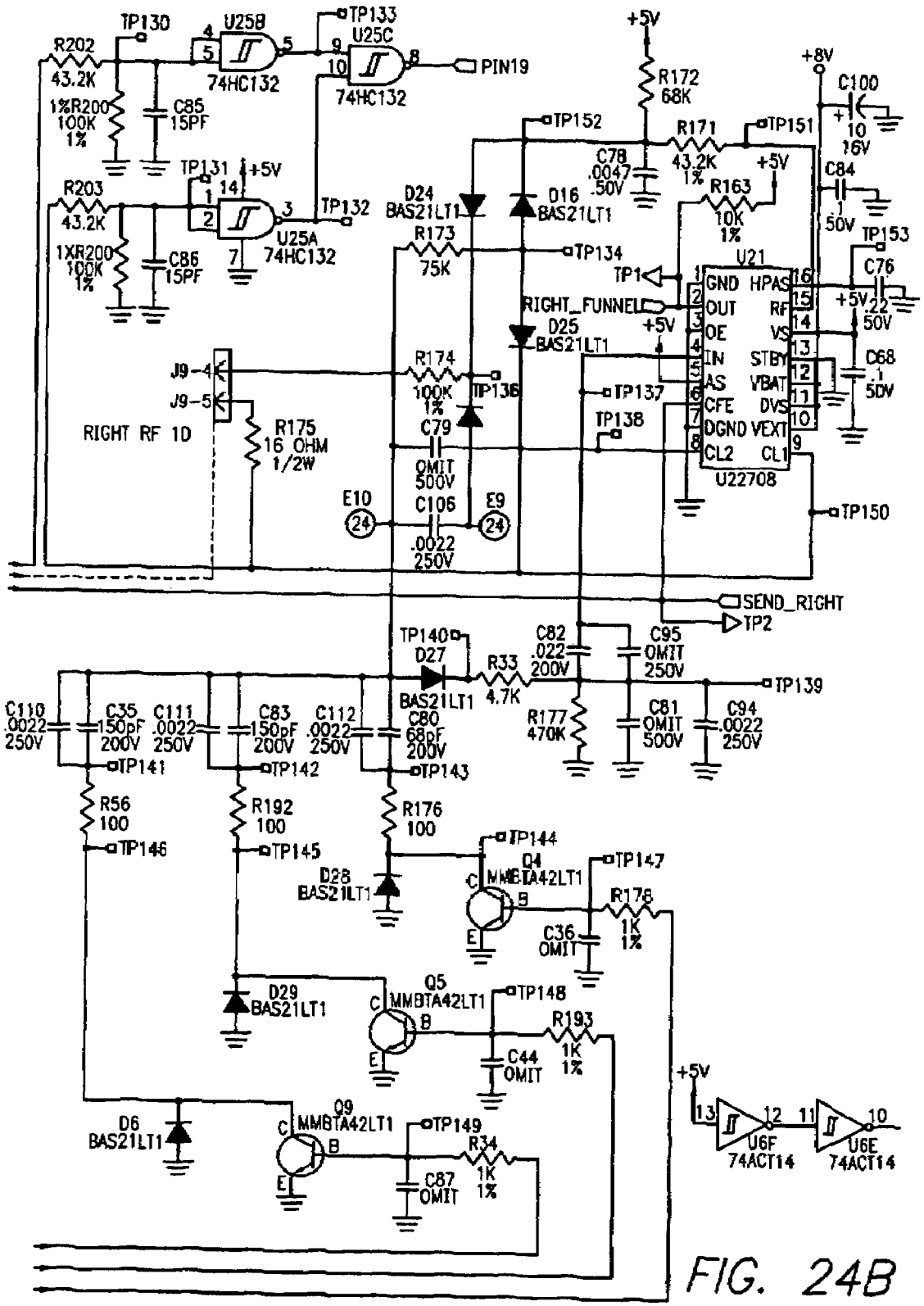
Figure 25A:
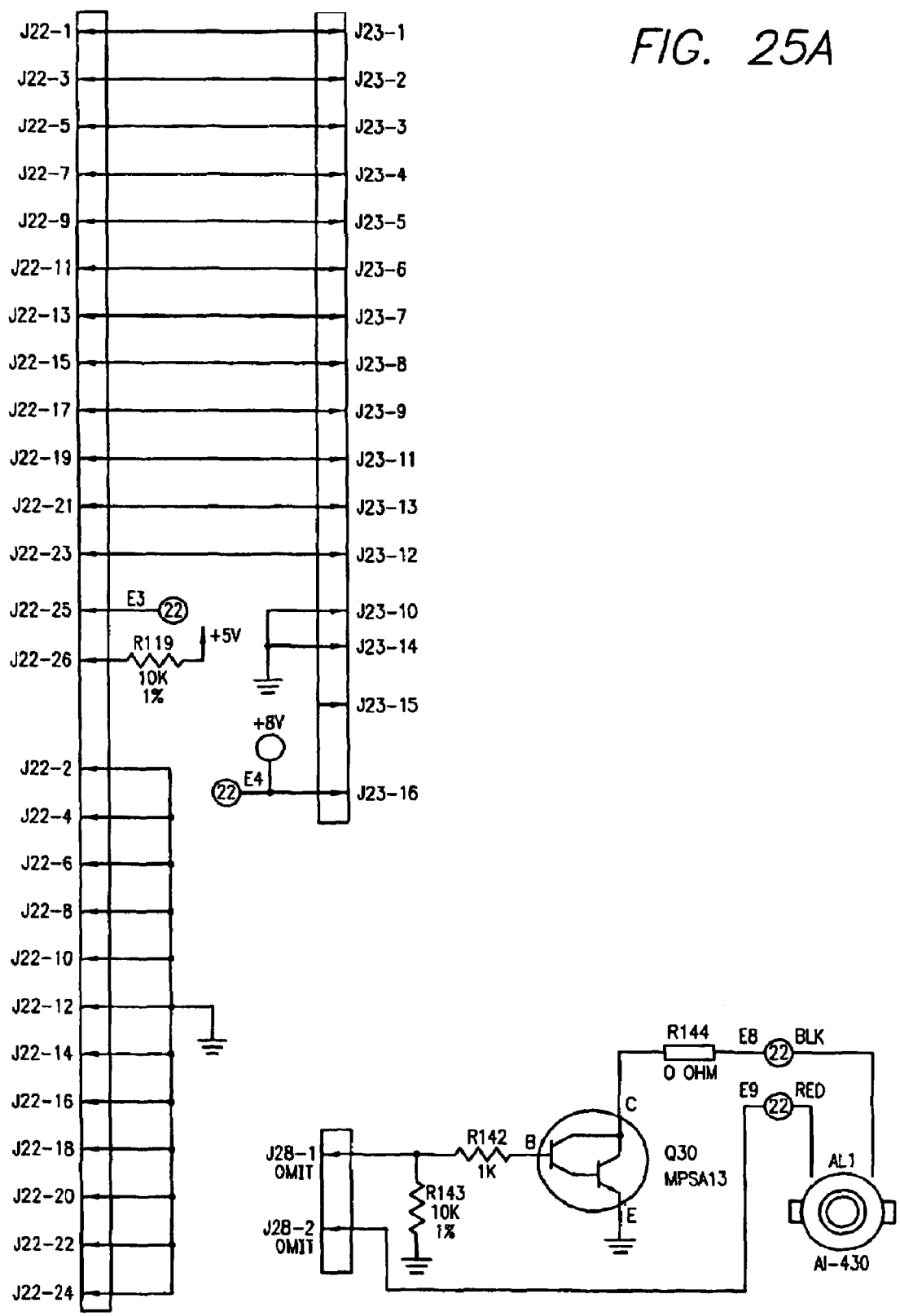
Figures 1, 25B:
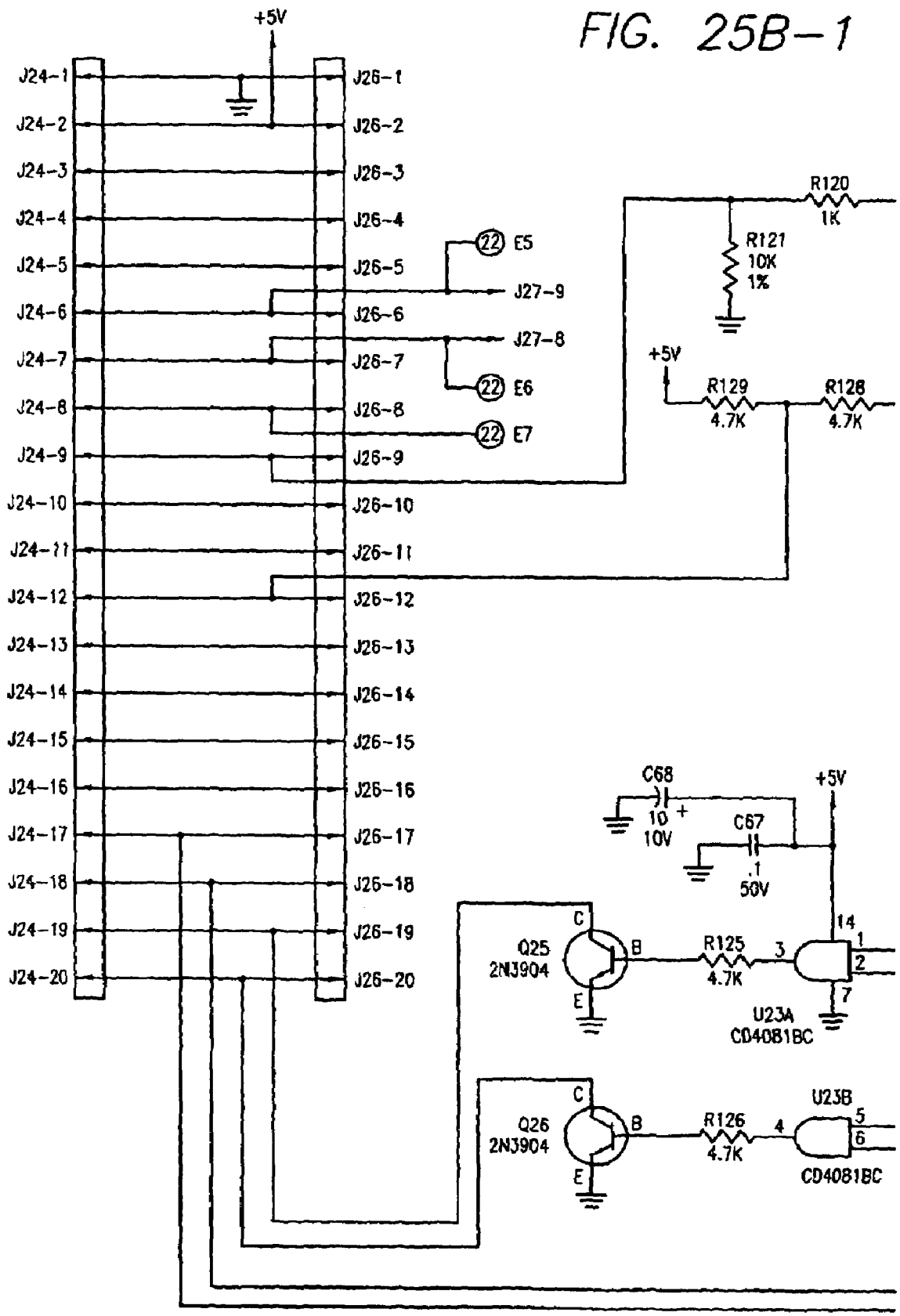
Figures 2, 25B:
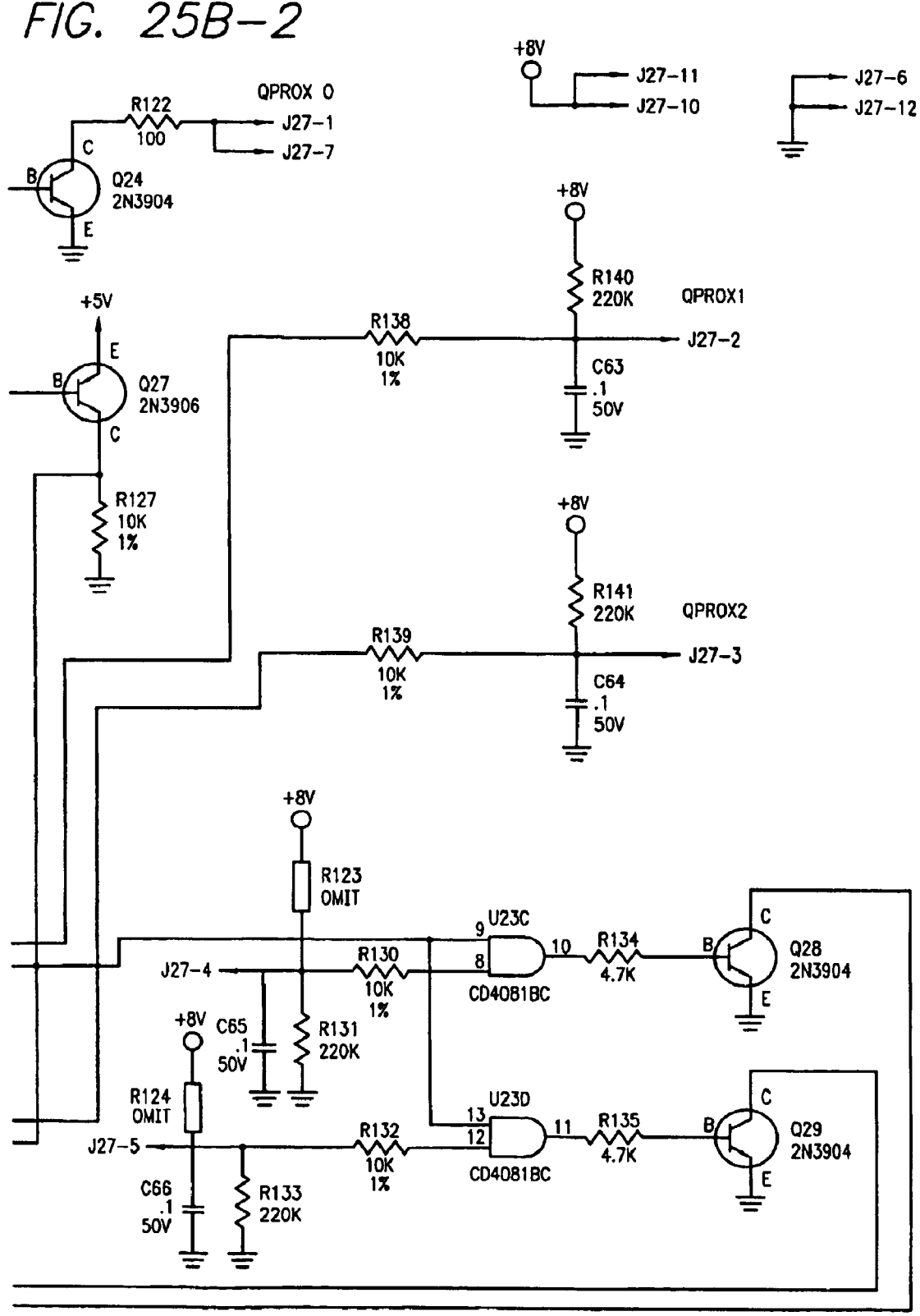
Figure 26:
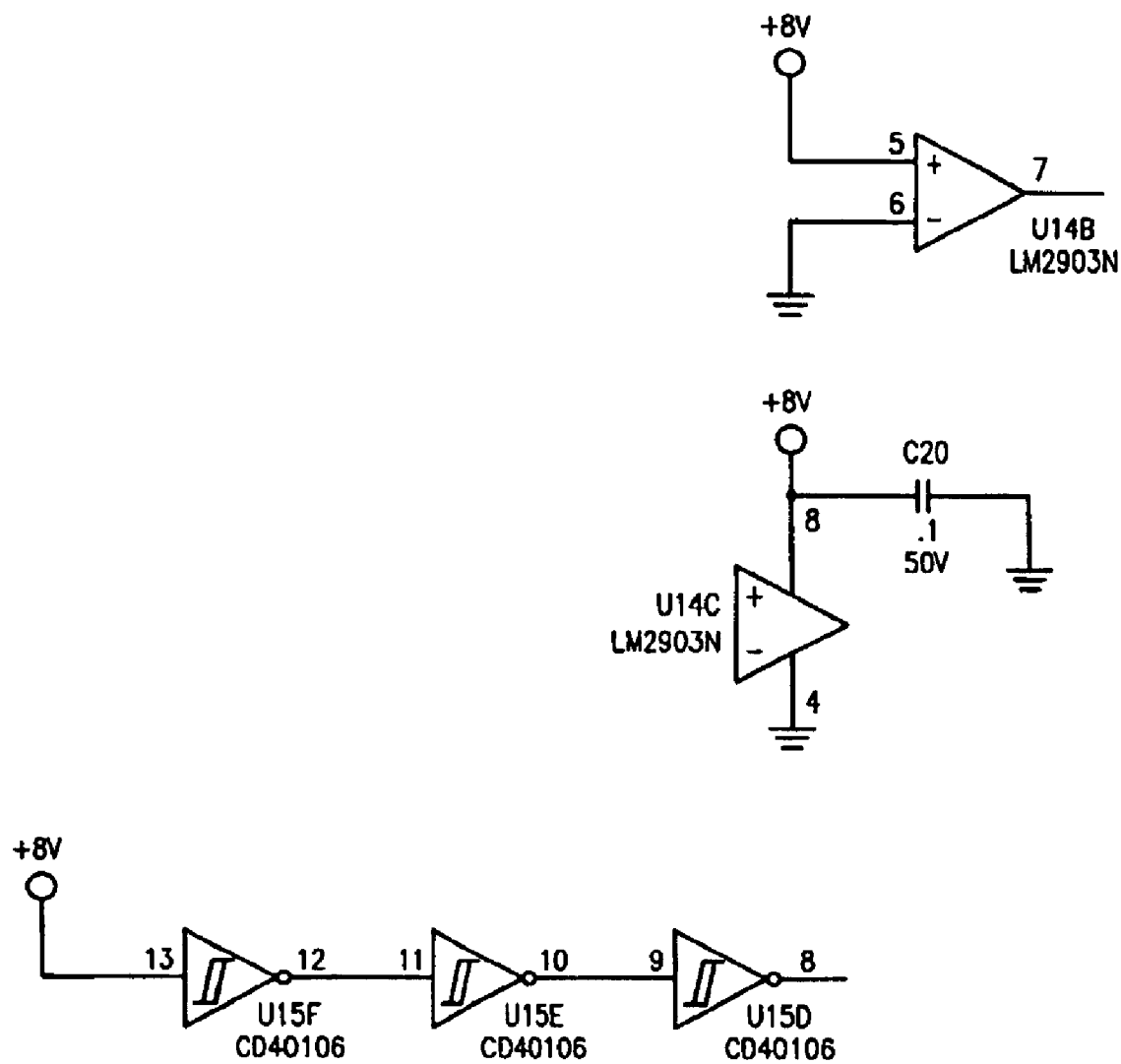
Figures 1, 26A:
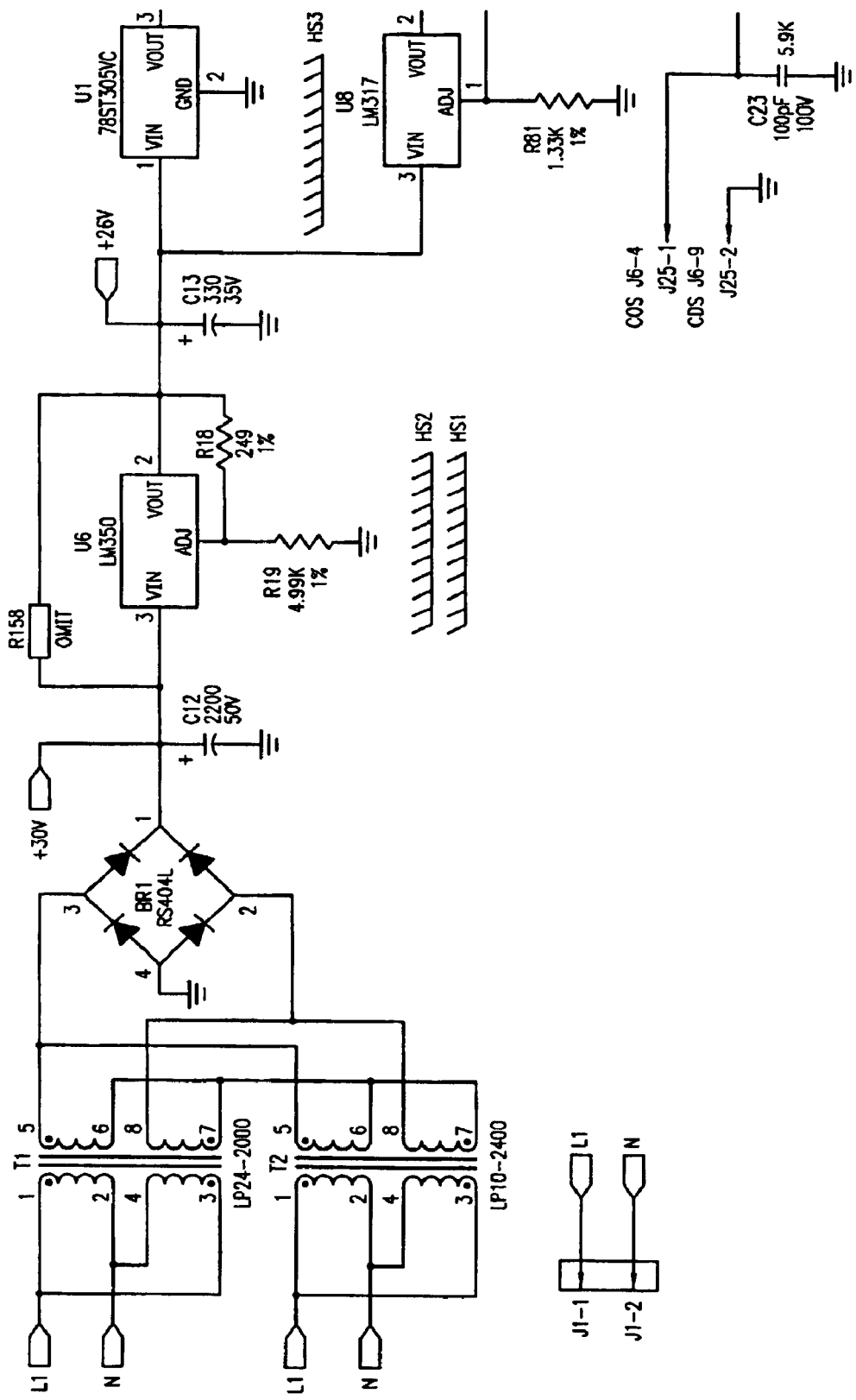
Figures 2, 26A:
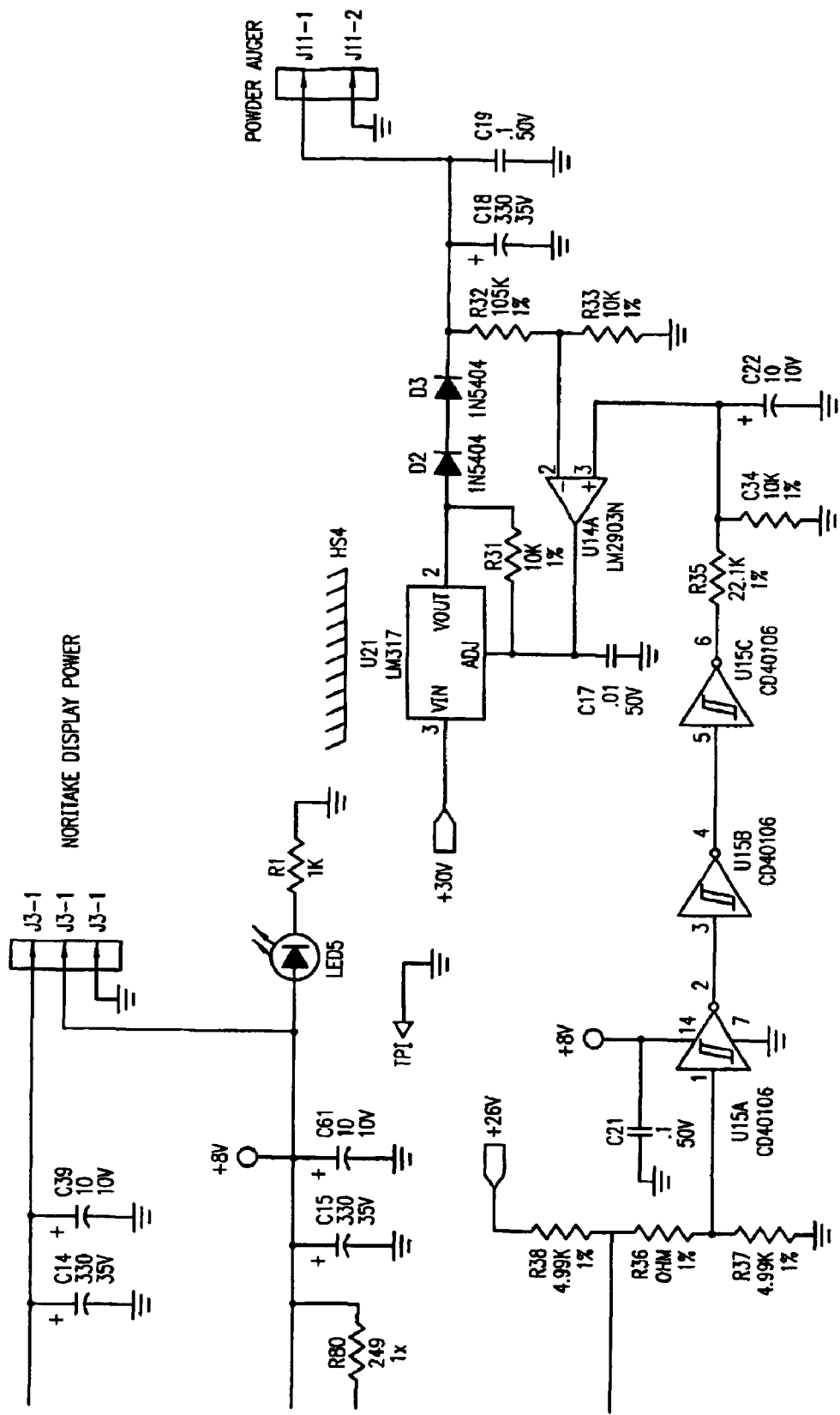
Figure 26B:
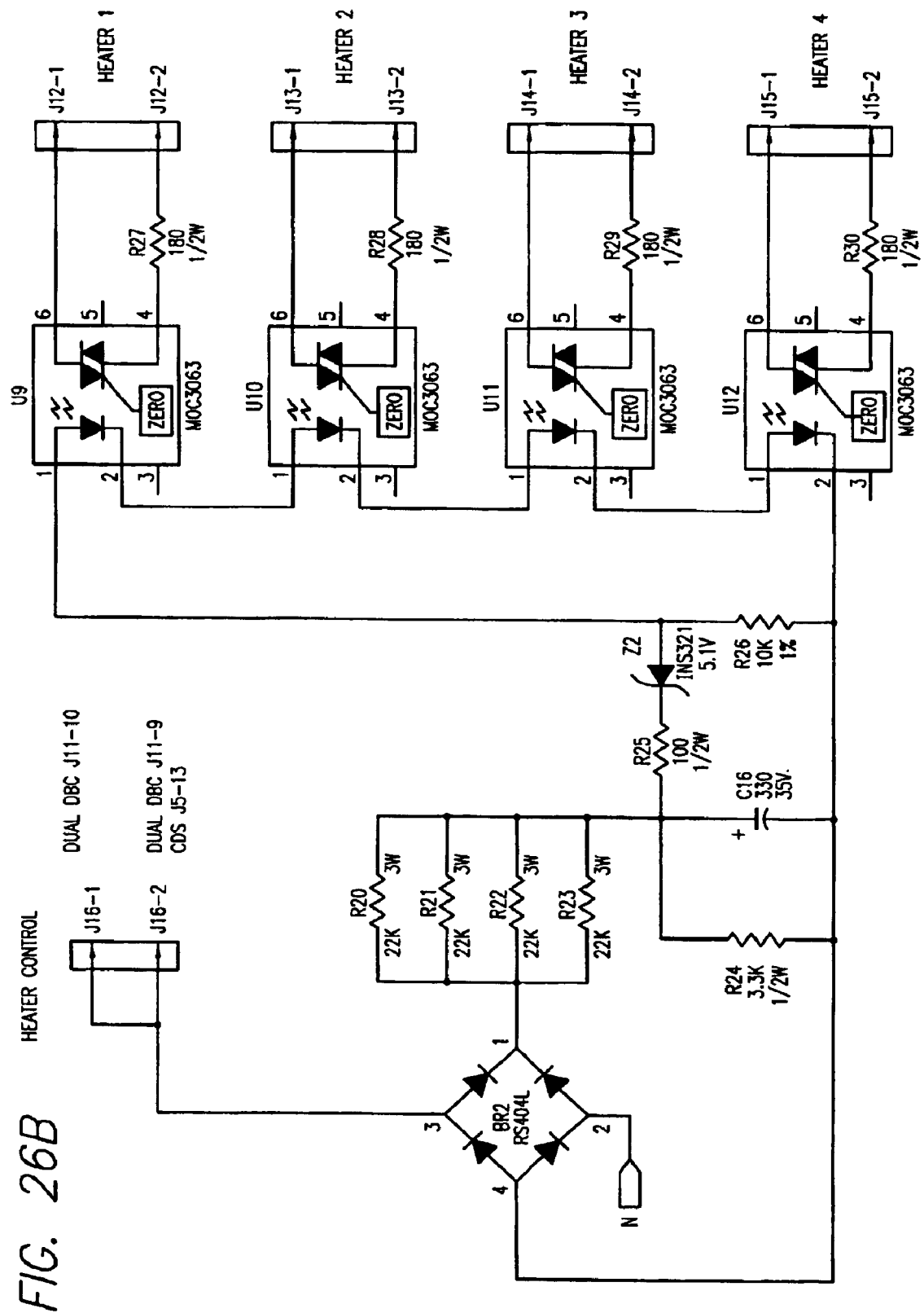
Figure 27A:
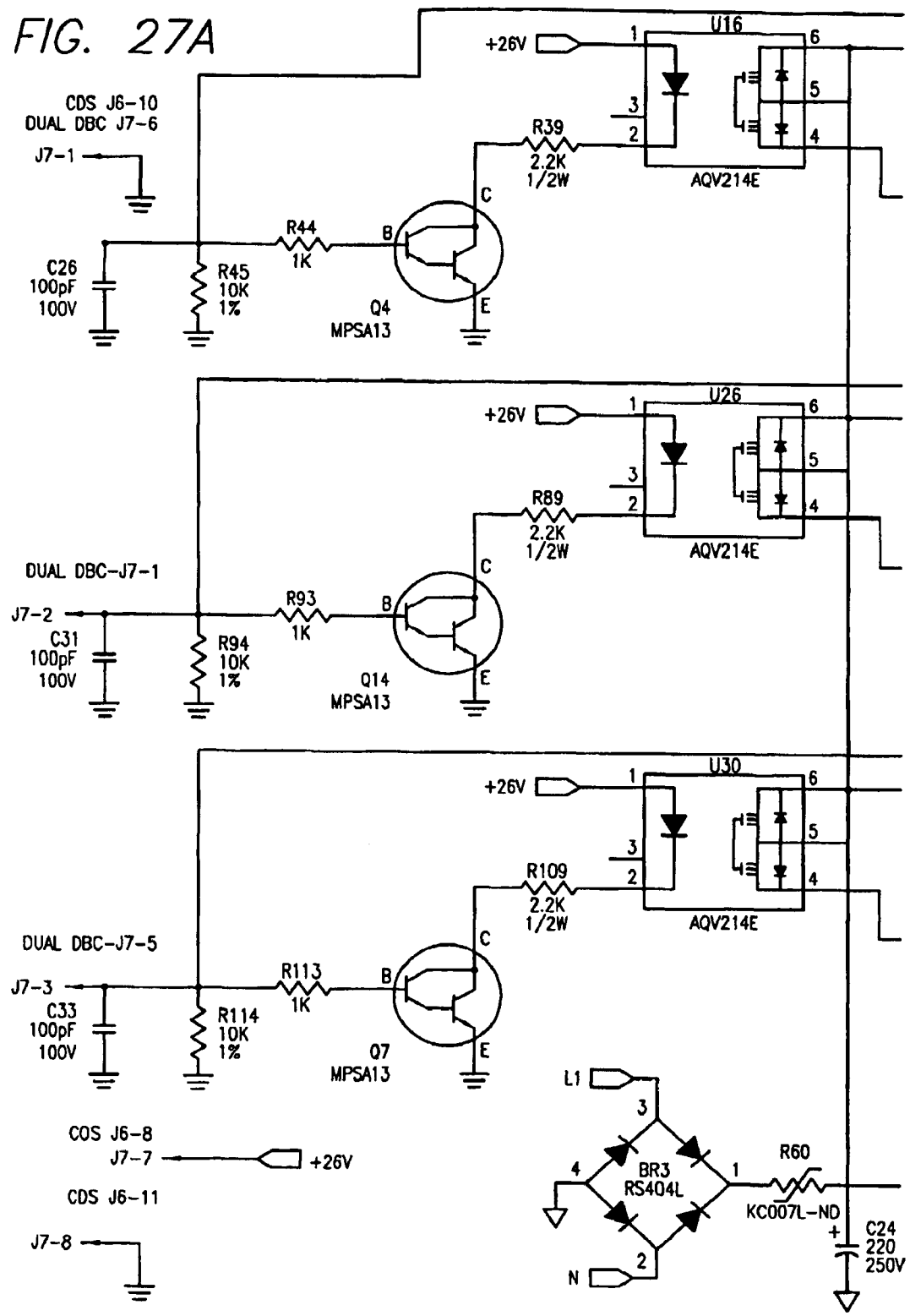
Figure 27B:
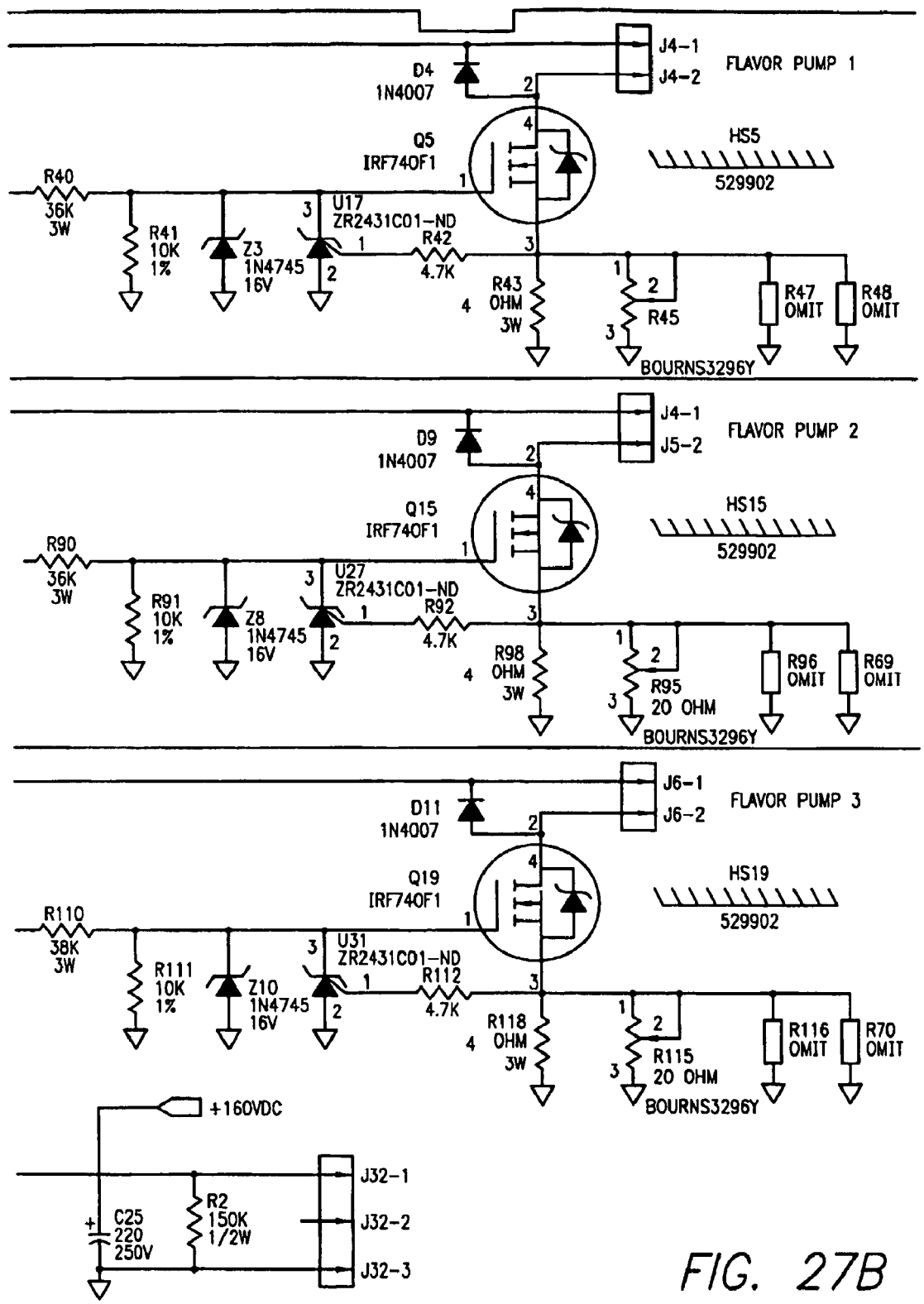
Figure 27C:
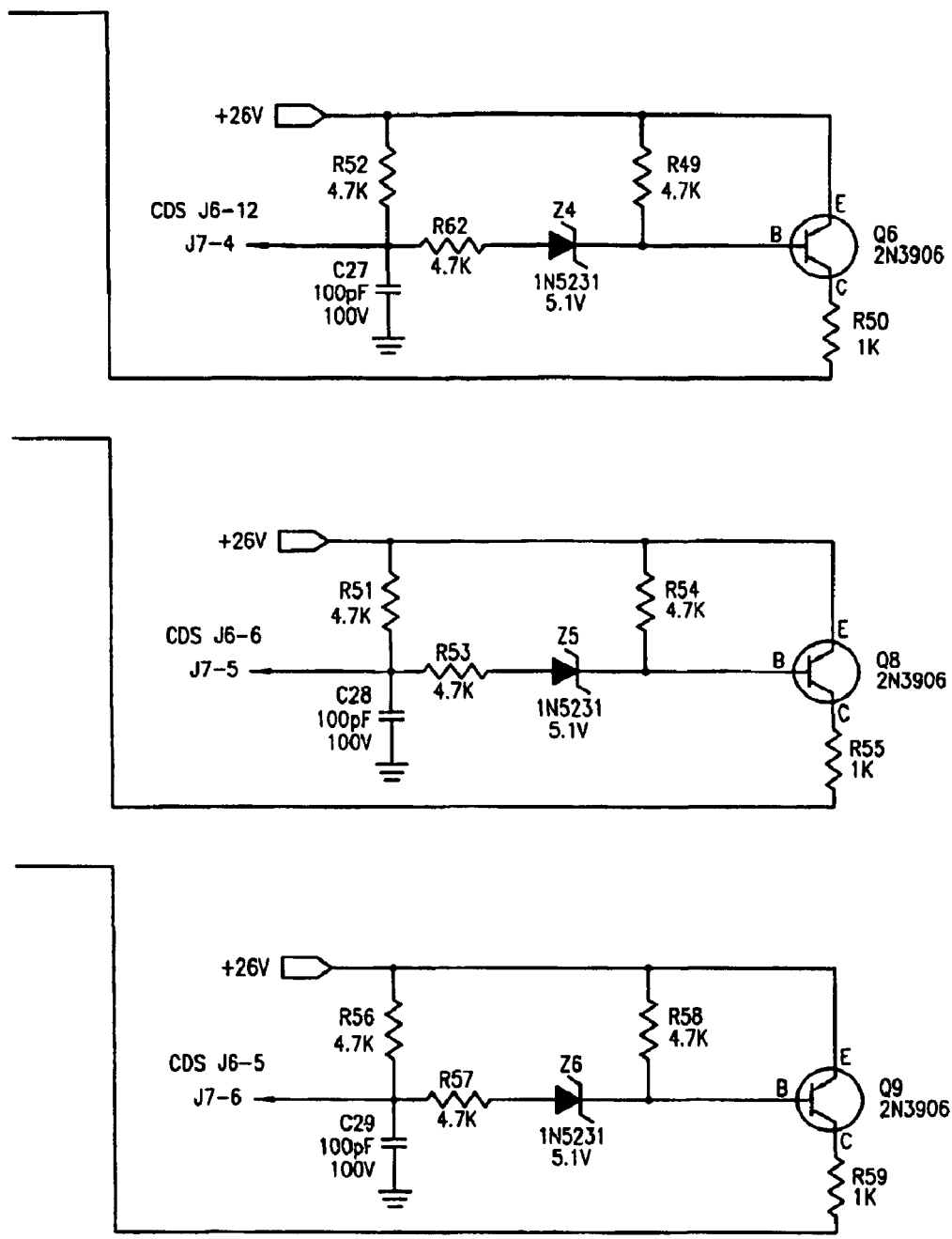
Figure 28A:
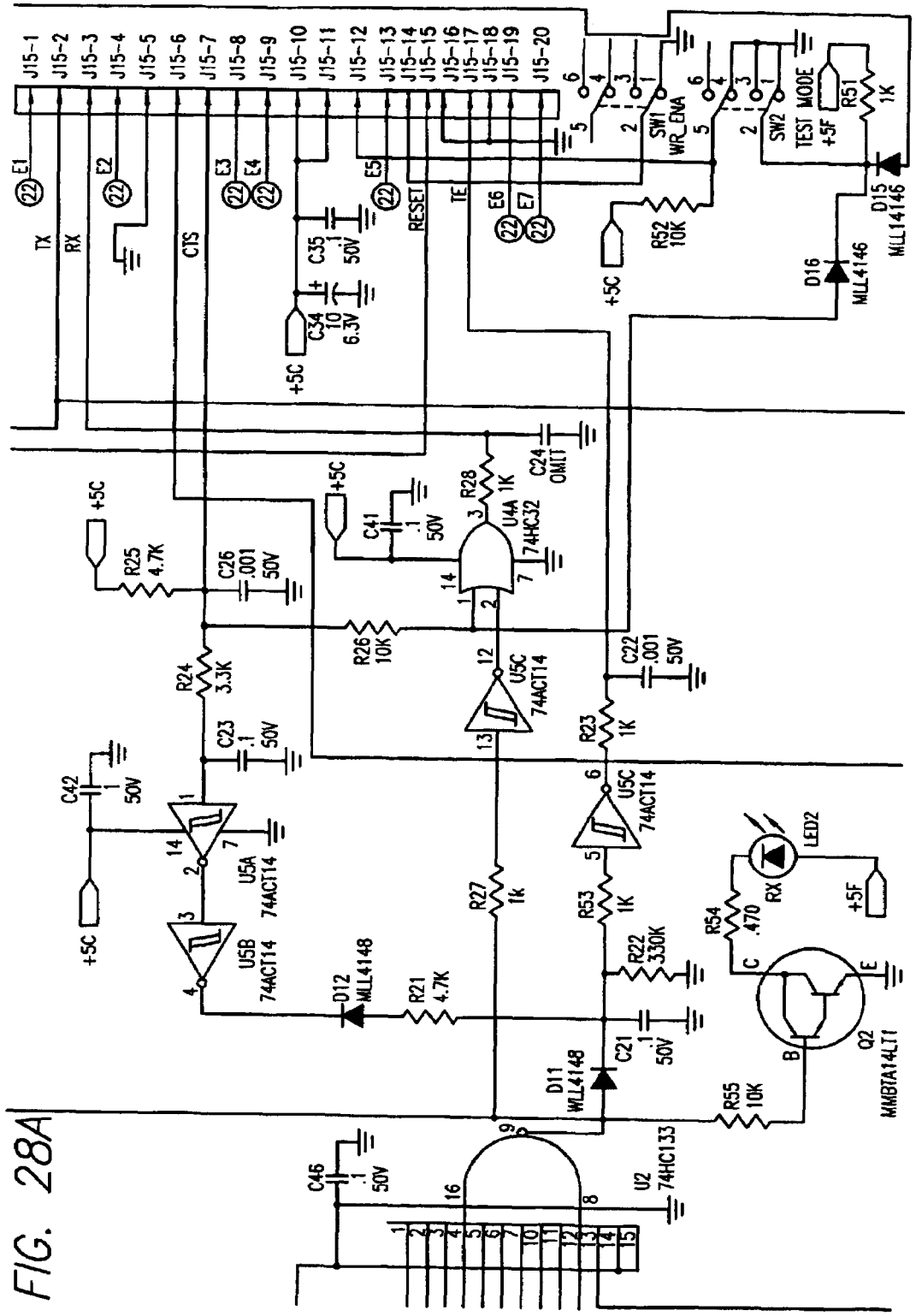
Figure 28B:
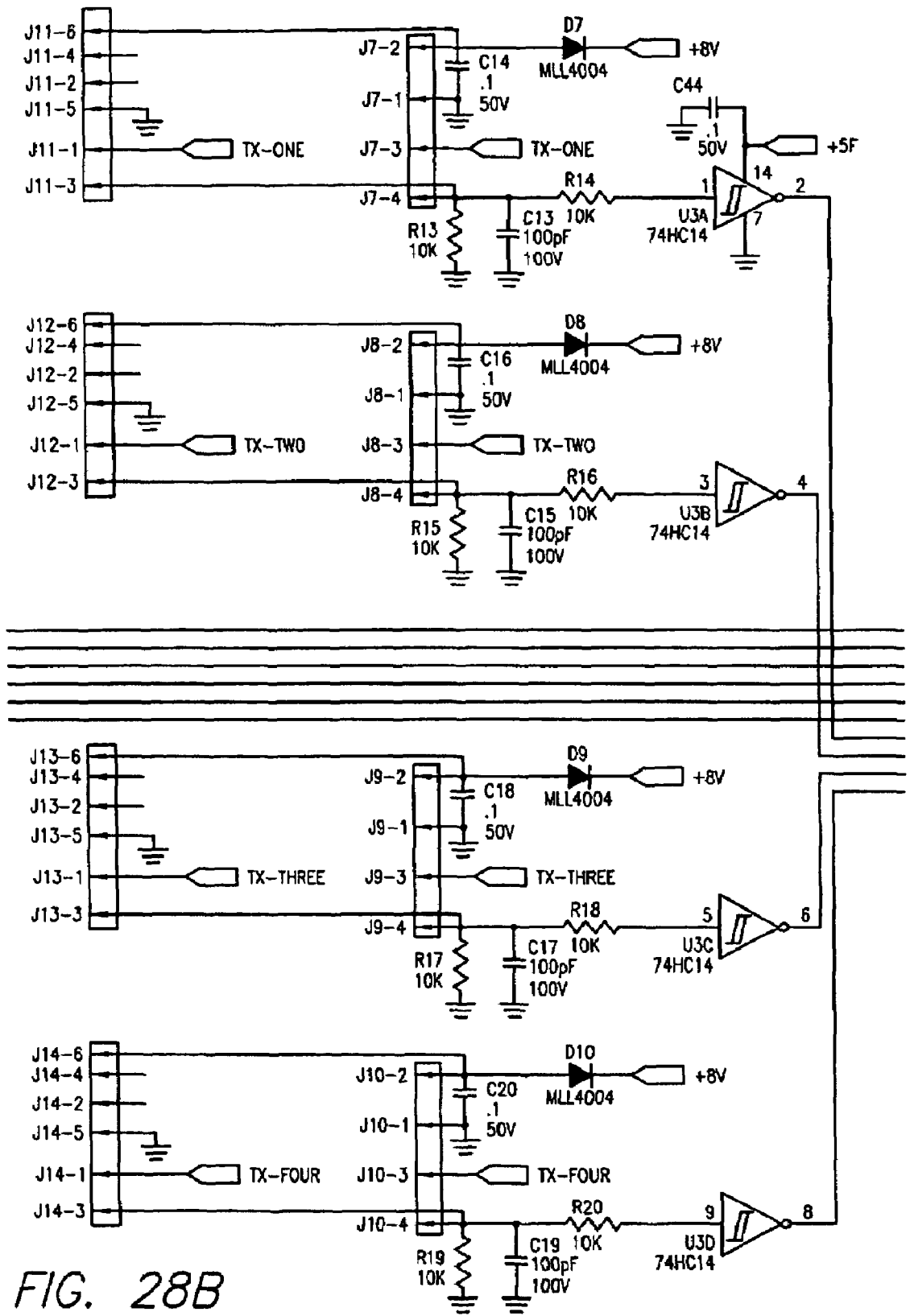
Figure 28C:
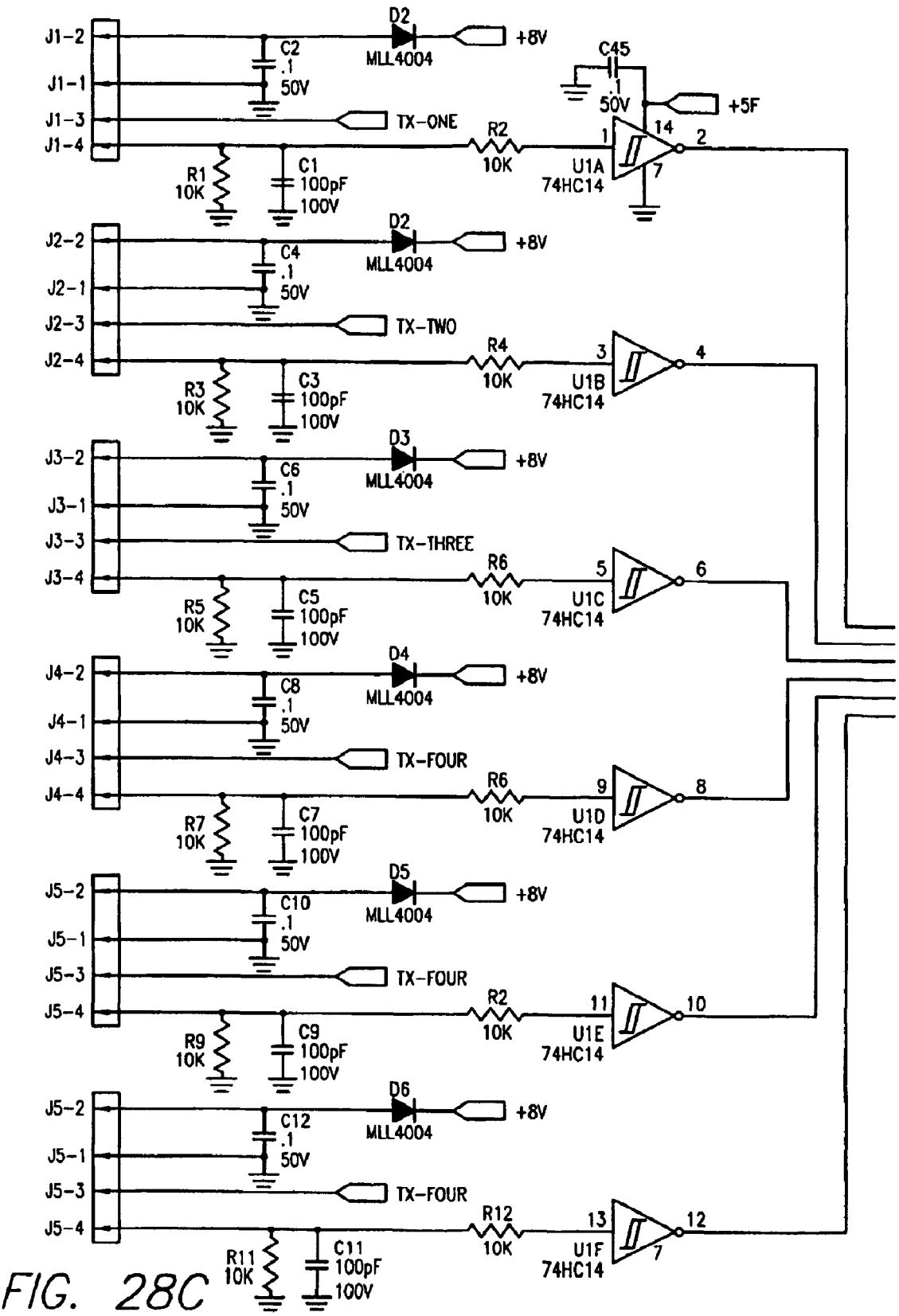
Figure 28D:
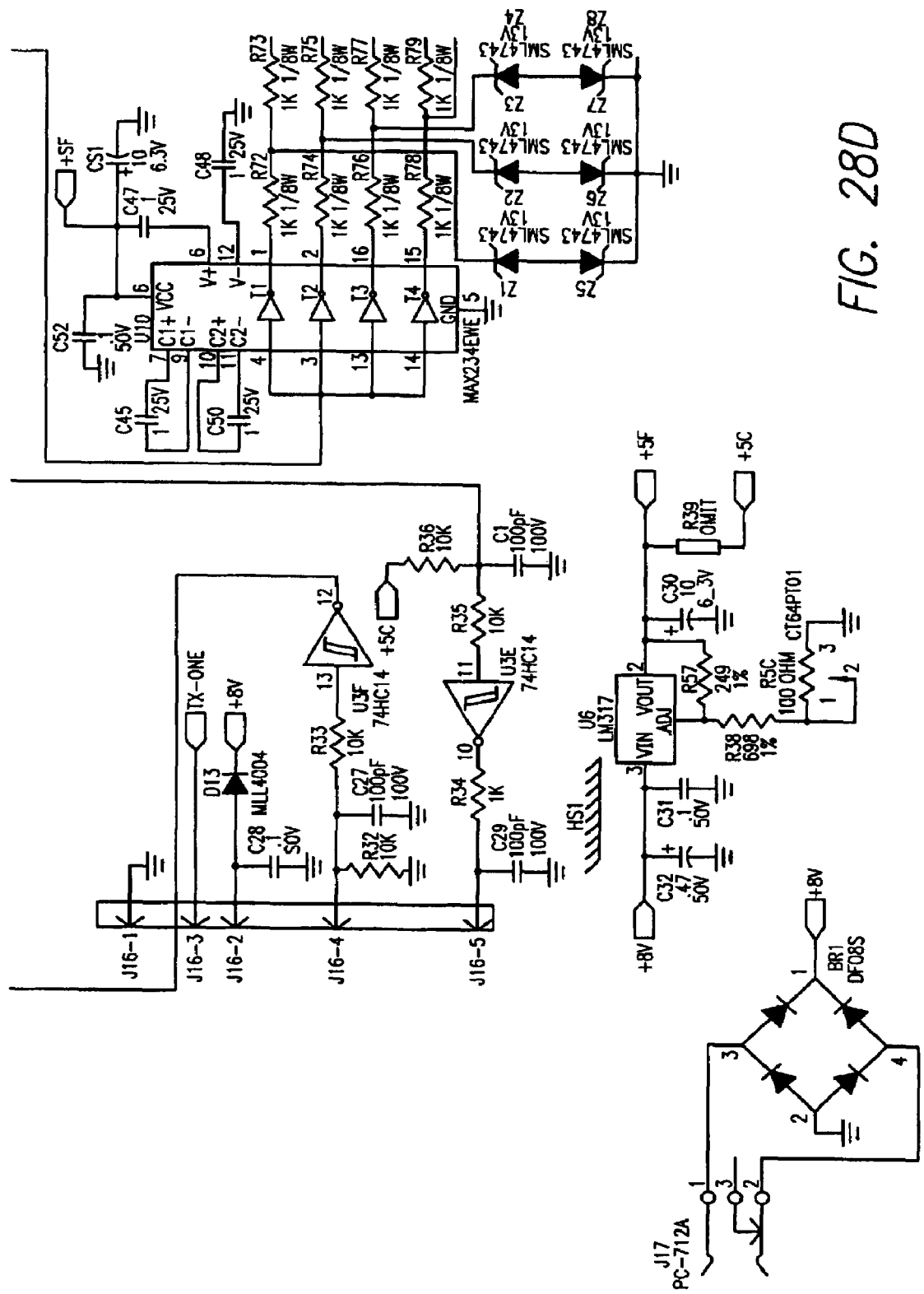

Turning now to FIGS. 19 and 20, the beverage system also includes a communications system or means 300 for communicating 302 between a corresponding beverage brewing, beverage making apparatus or beverage dispensing modules 32, 32a and a receiver or base station 304. Each of the modules 32, 32a includes a controller 76, 76a which is centralized for use with multiple modules or dedicated to an individual module. The controller collects information about the module or modules. For purposes of this present discussion, we will refer to the controller as being dedicated to multiple modules and receiving information from each individual module associated therewith. The many modules associated with a single control also provides the added benefit of the modular assembly as described hereinabove. It should also be noted that the details of the circuitry used to achieve the communication system are illustrated in the detailed schematics provided in FIGS. 21-28 and all corresponding sub-portions thereof. For example, FIG. 21 is a general schematic of the overall system. FIGS. 22-28 provide details about the general system shown in FIG. 21. FIG. 21 has been noted with cross reference to the other figures which provide details about the portions of the circuitry shown generally in FIG. 21.

The controllers 76, 76a include the link 302 which connects the controller to the corresponding receiver or base station 304. In the present embodiment as diagrammatically illustrated in FIGS. 19 and 20, the controllers 76, 76a communicate with the receiver 304 by way of an RF link 302. Generally, the controllers are remote from the receiver and use the Link 302 and the associated means for linking to communicate the collected information about the beverage making apparatus. Antennae 306, 308 are provided on the controllers 76, 76a and the corresponding receivers 304 respectively. It should be noted that the communication link 302 may be in any one of a variety of forms such as hardwired physical point-to-point link, optical lines, light wave, ultrasonic, infrared or any other form of communication link between one or more devices.

The receiver 304 receives information from the controller or various components of the modules 32, 32a to identify information relating to the modules and operation of the modules. The receiver 304 may be in the form of a monitoring unit positioned in an appropriate location relative to an operator or attendant who has responsibility for or otherwise maintains the modules 32, 32a. The receiver 304 includes a means for displaying display 305 and can provide visual auditor or other information about numerous conditions. The display 304 allows a form of the collected information about the beverage making apparatus to be displayed at the receiver. The visual display may include, but is not limited to lights, text, symbolic images (i.e., dispenser "full" showing a colored or shaded dispenser and a dispenser "empty" showing an unshaded dispenser), and mechanical devices that tare operated or other visual displays. An auditory display may include, but is not limited to speech information, alarms, tones or other signals that van be heard. Tactile displays are also contemplated in the form of a vibrating surface, vibrating device worn by the operator or other means for letting the operator or other means for letting the operator know about he collected information. For example, the following is a list of the messages or conditions which can be displayed:

Receiver fault;
Please wait attempting communication;
Communication failure, coffee module #;
Communication fault, soluble module #;
Flavor [type] low, coffee module #;
Flavor [type] low, soluble module #;
Hopper low, soluble module #;
Hopper empty, soluble module #;
Coffee empty, coffee module #;
Coffee low, coffee module #;
Freshness expired, coffee module #;
Dumping in _____ minutes, coffee unit #;
Server removed, coffee module #;
Refill too long;
Temperature probe open;
Temperature probe short;
Heating too long;
Over flow safety;
Coffee stations all OK; and
Soluble stations all OK.

For example, in an convenience store setting, multiple modules 32, 32a may be generally remotely positioned in one portion of the store, for example, a rearward location of the store, if desired. The operator of the beverage system may also be the same person responsible for stocking of the equipment, and register activities. As such, one person is required to operate and maintain many components of the convenience store facility. The receiver 304 may be positioned at the cash register so that while the attendant is operating the cash register he may also be notified of matters that require his attention at the modules 32, 32a.

For example, if a module 32a indicates that a container 68 is empty the controller 76 will communicate with the receiver 304 to indicate this condition. The receiver may also be configured with audible alarms and visual displays to provide additional information. For example, a display may identify which module and the specific condition associated with the module which has provided a signal to the receiver 304. The operator can then make a decision how to use that information relative to his responsibilities at the cash register. If an emergency requires immediate attention he can secure the cash register and address the emergency while attending to the module 32. Alternatively, if it is a slow period in the store and a module is indicating that a container 68 is empty he can put off attending to this condition until he completes one or more transactions in queue.

The signal communication between the controller 76 and the receiver 304 may be a single path signal or in the form of a multiple path verification signal. For example, as shown in FIGS. 19 and 20 a first signal 310 is transmitted from the controller 76 to the receiver 304. This initial communication may report the status of a condition at the module 32. The receiver 304 can then return a copy of the information 312 to the controller 76. If the controller confirms the information received (312) it can then send a return confirmation 314 that the information is correct.

This is a useful communication link in the present situation due to the presence of electrical noise and other interference within other beverage system applications. For example, each of the components associated with the modules 32, 32a may provide some degree of electrical or other noise. Additionally, other systems within the beverage system setting may be producing RF or other signals which could create interference. As such, the present embodiment providing the verification communication links 310-314 helps facilitate and assure accurate and timely communication. In the event of excessive interference such as from patrons of the store using telephone or RF communication devices, the controller 76 can continue to periodically send a message 310 to the receiver 304 until the verification signal 312 is received.

While preferred embodiments are disclosed, illustrated and described, it is envisioned that those skilled in the art may devise various modifications and equivalents without departing from the spirit and scope of the disclosure as recited in the following claims.

What is claimed is:

1. A liquid flavor dispensing system in combination with beverage brewing apparatus for providing heated water to infuse a beverage brewing substance, the combination comprising:

a brewing container for retaining a brewing substance during a brewing cycle;

a controllable heated water supply coupled to the brewing container for controllably delivering heated water to the brewing container during the brewing cycle;

means for generally holding a charge of the brewing substance in the brewing container for infusing a brewing substance in the brewing container to extract a brewed beverage therefrom;

a container for retaining a liquid flavoring;

a passage connecting the liquid flavoring container to the brewing container; and a controllable pump moving liquid flavoring from the liquid flavoring container through the passage to the brewing container so that liquid flavoring is present in the heated water while the heated water is infusing the brewing substance and mixed with the brewed beverage extracted therefrom.

2. The liquid flavor dispensing system as in claim 1, further comprising means for monitoring a quantity of liquid flavoring in the container.

3. The liquid flavor dispensing system as in claim 2, wherein the means for monitoring includes a sensor associated with the container for detecting the quantity of liquid flavoring in the container.

4. The liquid flavor dispensing system as in claim 1, including monitoring means associated with the pump for detecting a characteristic of the pump for inferring the quantity of liquid flavoring in the container.

5. A method of combining liquid flavoring for use with a beverage brewing apparatus, the method comprising the steps of:

providing a brewing substance;

providing a liquid flavoring;

providing a passage for dispensing the liquid flavoring to a beverage brewing apparatus;

brewing the brewing substance by infusing a beverage brewing substance with hot water;

dispensing a quantity of liquid flavoring through the passage; and combining the dispensed liquid flavoring with the beverage brewing substance for modifying the flavor of the beverage so that the flavoring, hot water and beverage brewing substance are present at the same time during brewing.

6. The method of combining a liquid flavoring for use with a beverage brewing apparatus of claim 5, further comprising the steps of:

providing a hot liquid distribution system in combination with the beverage brewing apparatus; and dispensing liquid flavoring to a location proximate to dispensing of hot liquid from the hot liquid distribution system for combining the liquid flavoring with the hot liquid prior to combining with the beverage brewing substance.

7. The method of combining a liquid flavoring for use with a beverage brewing apparatus of claim 5, further comprising the steps of:

providing a liquid distribution system having a dispensing line for delivering liquid to combine with the beverage brewing substance; and dispensing the liquid flavoring to the dispensing line for mixing the flavoring with the liquid prior to mixing the liquid with the beverage brewing substance.

8. The method of combining a liquid flavoring for use with a beverage brewing apparatus of claim 5, further comprising the step of:

dispensing liquid flavoring to the beverage brewing substance during the brewing step.

* * * * *